(12) United States Patent
Evans et al.

(10) Patent No.: US 11,670,792 B2
(45) Date of Patent: Jun. 6, 2023

(54) REDOX FLOW BATTERY AND BATTERY SYSTEM

(71) Applicant: ESS Tech, Inc., Wilsonville, OR (US)

(72) Inventors: Craig E. Evans, West Linn, OR (US); Sean Casey, Portland, OR (US); Thiago Groberg, Tigard, OR (US); Yang Song, West Linn, OR (US)

(73) Assignee: ESS Tech, Inc., Wilsonville, OR (US)

( * ) Notice: Subject to any disclaimer, the term of this patent is extended or adjusted under 35 U.S.C. 154(b) by 45 days.

(21) Appl. No.: 17/308,873

(22) Filed: May 5, 2021

(65) Prior Publication Data

US 2021/0359329 A1 Nov. 18, 2021

Related U.S. Application Data

(60) Provisional application No. 63/025,234, filed on May 15, 2020.

(51) Int. Cl.
| | |
|---|---|
| *H01M 8/18* | (2006.01) |
| *H01M 8/0247* | (2016.01) |
| *H01M 8/242* | (2016.01) |
| *H01M 8/248* | (2016.01) |

(52) U.S. Cl.
CPC ........ *H01M 8/188* (2013.01); *H01M 8/0247* (2013.01); *H01M 8/242* (2013.01); *H01M 8/248* (2013.01)

(58) Field of Classification Search
CPC .................................................. H01M 8/188
See application file for complete search history.

(56) References Cited

U.S. PATENT DOCUMENTS

| | | | |
|---|---|---|---|
| 2003/0232233 A1 | 12/2003 | Andrews et al. | |
| 2005/0118486 A1 | 6/2005 | Strobel et al. | |
| 2008/0292964 A1* | 11/2008 | Kazacos ............... | H01M 8/109 |
| | | | 429/209 |
| 2010/0021790 A1 | 1/2010 | Abu-Isa et al. | |
| 2013/0171545 A1 | 7/2013 | Betts et al. | |
| 2016/0254551 A1* | 9/2016 | Nakaishi ............ | H01M 8/0258 |
| | | | 429/101 |
| 2018/0034073 A1* | 2/2018 | Seeba ................. | H01M 8/0286 |
| 2019/0252677 A1* | 8/2019 | Liu ....................... | H01M 4/582 |
| 2020/0194809 A1* | 6/2020 | Kato ................... | H01M 8/0273 |

FOREIGN PATENT DOCUMENTS

WO    2015009017 A1    1/2015

OTHER PUBLICATIONS

Casey, S. et al., "Redox Flow Battery and Battery System," U.S. Appl. No. 17/308,843, filed May 5, 2021, 54 pages.

(Continued)

*Primary Examiner* — Brian R Ohara
(74) *Attorney, Agent, or Firm* — McCoy Russell LLP

(57) ABSTRACT

A redox flow battery and battery system are provided. In one example, the redox flow battery includes a cell stack assembly having a plate assembly positioned on a lateral side of the cell stack assembly and comprising an elastic flange including a recess mated with a section of a conductive plate and compliant in at least one of a lateral direction and a vertical direction, and a plate frame coupled to the elastic flange.

18 Claims, 17 Drawing Sheets

(56) References Cited

OTHER PUBLICATIONS

Evans, C. et al., "Redox Flow Battery and Battery System," U.S. Appl. No. 17/308,845, filed May 5, 2021, 48 pages.
Casey, S. et al., "Electrode Assembly for a Redox Flow Battery," U.S. Appl. No. 17/308,913, filed May 5, 2021, 46 pages.
ISA Korean Intellectual Property Office, International Search Report and Written Opinion Issued in Application No. PCT/US2021/030949, dated Aug. 24, 2021, WIPO, 12 pages.

* cited by examiner

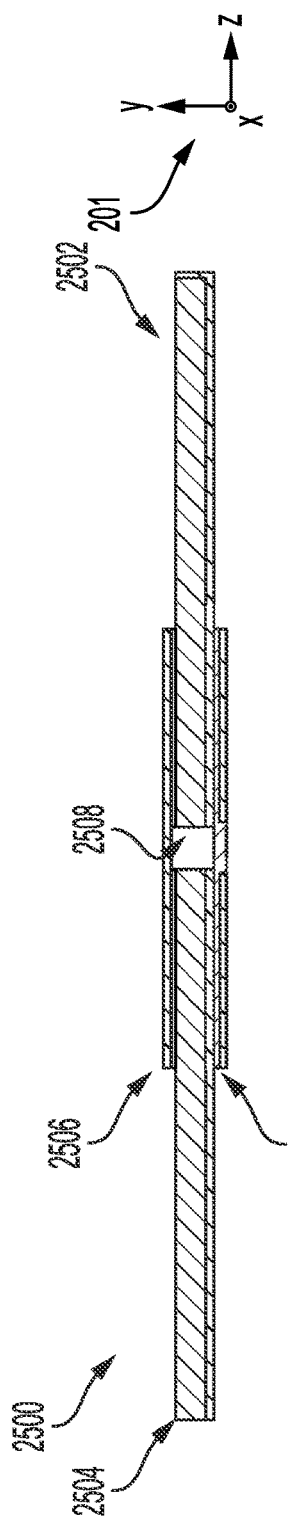
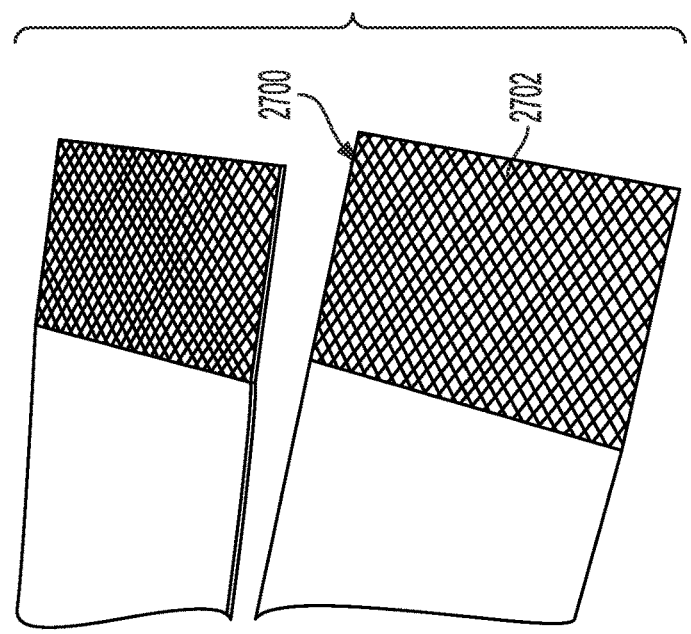
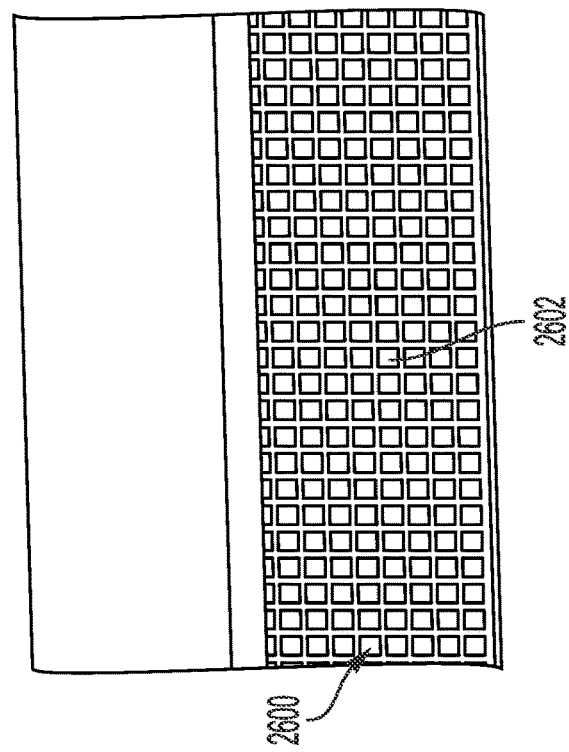
FIG. 25
FIG. 26
FIG. 27

REDOX FLOW BATTERY AND BATTERY SYSTEM

CROSS-REFERENCE TO RELATED APPLICATION

The present application claims priority to U.S. Provisional Application No. 63/025,234, entitled "REDOX FLOW BATTERY AND BATTERY SYSTEM", and filed on May 15, 2020. The entire contents of the above-listed application are hereby incorporated by reference for all purposes.

FIELD

The present description relates generally to a redox flow battery and battery system.

BACKGROUND AND SUMMARY

Redox flow batteries are suitable for grid scale storage applications due to their capability for scaling power and capacity independently, as well as for charging and discharging over thousands of cycles with reduced performance losses in comparison to conventional battery technologies. Iron hybrid redox flow battery are particularly attractive due to the incorporation of low cost materials in the cell stack. The iron redox flow battery (IFB) relies on iron, salt, and water for electrolyte. These earth abundant and inexpensive materials used in the IFB along with the omission of harsh chemical, in some embodiments, reduces the battery's environmental footprint.

The iron redox flow battery (IFB) relies on iron, salt, and water for electrolyte, thus comprising earth abundant and inexpensive materials and in some embodiments forgoes the incorporation of harsh chemicals, thereby reducing the battery's environmental footprint.

Thermal management of the cell stack presents various challenges in redox flow battery design. For instance, prior cell stacks may not adequately accommodate for disproportionate thermal expansion/contraction of different components in the stack. Consequently, the cell stack may warp during battery use. In turn, electrolyte flow patterns may be impacted such that battery efficiency, battery output, and/or battery structural integrity are reduced, for example. Cell stack warping may be exacerbated when the size of the cell stack is increased or multiple stacks are included in a single battery module. Furthermore, in certain cell stack layouts, adjacent components may deform due to pressure and/or thermal stresses. Specifically, in certain scenarios, frame flanges may deflect due to cross-pressure and interrupt flow of electrolyte in cell stack channels.

The inventors have recognized the abovementioned drawbacks of previous redox flow batteries and developed a redox flow battery to at least partially overcome the drawbacks. In one example, the redox flow battery includes a cell stack assembly having a plate assembly positioned on a lateral side of the cell stack assembly. The plate assembly includes an elastic flange having a recess mated with a section of a conductive plate and designed with longitudinal compliance. The plate assembly also includes a plate frame coupled to the elastic flange. The elastic flange accommodates for cell stack expansion/contraction caused by thermal gradients in the stack. Consequently, chances of unwanted stack warping are reduced.

In one example, the elastic flange may be heat welded to the plate frame. Heat welding the elastic flange to the plate frame allows adhesive bonding between the flange and the frame to be omitted, if desired. Consequently, a stronger interface may be formed between the plate frame and the elastic flange, reducing the chance of frame and flange decoupling.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 22-25 show different examples of a bipolar plate assembly.

FIGS. 26-27 show use-case examples of different flange materials and material texturing.

FIGS. 2-27 are drawn approximately to scale. However, other relative dimensions may be used in other embodiments.

DETAILED DESCRIPTION

The following description relates to systems and methods serving to reduce manufacturing costs of a redox flow battery. To achieve the reduced manufacturing cost the battery system may include a space efficient compression assembly designed to both compress the cell stack and structurally reinforce the battery. The compression assembly may achieve the aforementioned benefits via leaf springs that extend down the sides of the pressure plates and exert an inward preload force on the cell stack. Leaf springs compactly provide cell stack compression to reduce (e.g., prevent) deflection of active areas in the battery during operation. The pressure plates may include reinforcing ribs that allow the compression assembly to be structurally reinforced.

The redox flow battery may also include modular features allowing the battery system to be cost effectively scaled, as desired. For instance, pressure plates in the battery may incorporate stacking protrusions and detents in flanges of the pressure plates. The protrusions and detents mate with corresponding protrusions and detents in adjacent batteries to facilitate battery unit stacking. Consequently, efficient system scaling (e.g., power and/or capacity scaling) can be achieved, if desired.

The battery system may even further include a plate assembly having an elastic flange with a recess mated with a conductive plate (e.g., bipolar plate or monopolar plate). The elastic flange allows for thermal expansion and contraction of components with different coefficients of thermal expansion (CTE) in the cell stack during battery operation. Consequently, the chance of unwanted cell stack deformation during battery operation is reduced. In one specific example, the elastic flange may have an S-shape in which a section of the flange extends between longitudinally offset sections. The S-shaped flange enables higher battery cell stack compression to be achieved. Increased stack compression may be particularly beneficial in batteries having multiple cell stacks.

Figure 1:
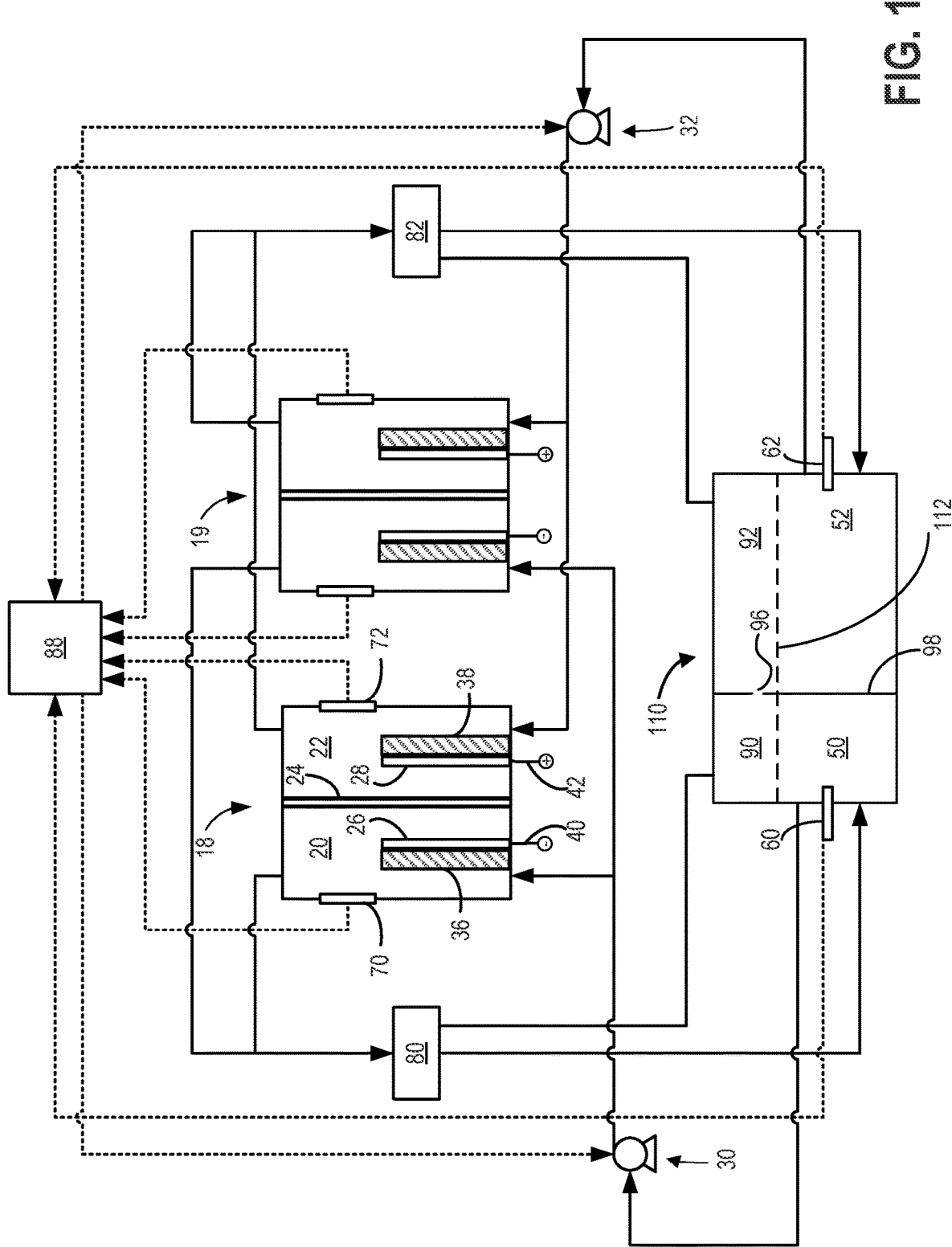
FIG. 1 shows a schematic of an example redox flow battery system.

As shown in FIG. 1, in a redox flow battery system 10, a negative electrode 26 may be referred to as a plating electrode and a positive electrode 28 may be referred to as a redox electrode. A negative electrolyte within a plating side (e.g., a negative electrode compartment 20) of a first battery cell 18 may be referred to as a plating electrolyte, and a positive electrolyte on a redox side (e.g., a positive electrode compartment 22) of the first battery cell 18 may be referred to as a redox electrolyte.

Hybrid redox flow batteries are redox flow batteries that are characterized by the deposition of one or more of the electroactive materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., a maximum amount of energy stored) of the redox battery may be limited by the amount of metal plated during battery charge and may depend on the efficiency of the plating system as well as the available volume and surface area available for plating.

Anode refers to the electrode where electroactive material loses electrons and cathode refers to the electrode where electroactive material gains electrons. During battery charge, the positive electrolyte gains electrons at the negative electrode 26, therefore the negative electrode 26 is the cathode of the electrochemical reaction. During discharge, the positive electrolyte loses electrons; therefore, the negative electrode 26 is the anode of the reaction. Alternatively, during discharge, the negative electrolyte and negative electrode may be respectively referred to as an anolyte and anode of the electrochemical reaction, while the positive electrolyte and the positive electrode may be respectively referred to as a catholyte and cathode of the electrochemical reaction. During charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte includes iron ions in the form of iron salts (e.g., $FeCl_2$, $FeCl_3$, and the like), wherein the negative electrode includes metal iron. For example, at the negative electrode 26, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$. The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+}+2e^- \leftrightarrows Fe^0 \; -0.44 \text{ V (Negative Electrode)} \quad (1)$$

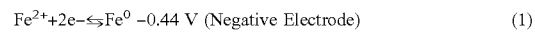

$$Fe^{2+} \leftrightarrows 2Fe^{3+}+2e^- \; +0.77 \text{ V (Positive Electrode)} \quad (2)$$

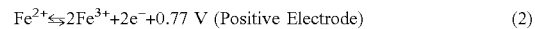

As discussed above, the negative electrolyte used in the IFB may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and may be dissolved back into the electrolyte. The equilibrium potential of the above reaction is –0.44 V and thus, this reaction provides a negative terminal for the desired system. On the positive side of the IFB, the electrolyte may provide $Fe^+$ during charge which loses an electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77 V, creates a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode 26 may be electrically coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate, causing it to plate onto the negative electrode 26.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of the first battery cell 18 to provide additional $Fe^{3+}$ ions via an external source, such as an external positive electrolyte tank 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte chamber 50 to increase the concentration or the volume of the negative electrolyte to the negative electrode compartment 20 side of the first battery cell 18.

In an IFB, the positive electrolyte includes ferrous ion, ferric ion, ferric complexes, or any combination thereof, while the negative electrolyte includes ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through a separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) may result in precipitation of $Fe(OH)_3$. Precipitation of $Fe(OH)_3$ may degrade the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, contributing to additional processing costs and complexity. Alternatively, adding specific organic acids to the positive electrolyte and the negative electrolyte in response to electrolyte pH changes may mitigate precipitate formation during battery charge and discharge cycling without driving up overall costs. Additionally, implementing a membrane barrier that inhibits ferric ion cross-over may also mitigate fouling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental impacts as compared with all other current advanced redox flow battery systems in production.

Continuing with FIG. 1, a schematic illustration of the redox flow battery system 10 is shown. The redox flow battery system 10 may include the first redox flow battery cell 18 fluidly connected to a multi-chambered electrolyte storage tank 110. The first redox flow battery may generally include the negative electrode compartment 20, separator 24, and positive electrode compartment 22. The separator 24 may include an electrically insulating ionic conducting barrier which prevents bulk mixing of the positive electrolyte and the negative electrolyte while allowing conductance of specific ions therethrough. For example, the separator 24 may include an ion-exchange membrane and/or a microporous membrane.

The negative electrode compartment 20 may include the negative electrode 26, and the negative electrolyte may be at least partially formed of electroactive materials. The positive electrode compartment 22 may include the positive electrode 28, and the positive electrolyte may include electroactive materials. In some examples, multiple redox flow battery cells 18 may be combined in series or in parallel to generate a higher voltage or current in a redox flow battery system. For example, in some examples, the redox flow battery system 10 may include two cell stacks, as shown in FIGS. 10-13, where each cell stack is formed of multiple battery cells. As an example, the redox flow battery system 10 is depicted in FIG. 1 with the first battery cell 18 as well as a second battery cell 19, similarly configured to the first battery cell 18. As such, all components and processes described herein for the first battery cell 18 may be similarly found in the second battery cell 19.

The first battery cell 18 may be included in a first cell stack and the second battery cell 19 may be included in a second cell stack. The first and second cells may be fluidly coupled or not fluidly coupled to one another but are each fluidly coupled to the electrolyte storage tank 110 and rebalancing reactors 80, 82. For example, each of the first and second battery cells 18, 19 may be connected to negative and positive electrolyte pumps 30 and 32 via common passages that branch to each of the first and second battery cells 18 and 19, as shown in FIG. 1. Similarly, the battery cells may each have passages that merge into common passages coupling the battery cells to the rebalancing reactors 80, 82.

Further illustrated in FIG. 1 are the negative and positive electrolyte pumps 30 and 32, both used to pump electrolyte solution through the flow battery system 10. Electrolytes are stored in one or more tanks external to the cell, and are pumped via the negative and positive electrolyte pumps 30 and 32 through the negative electrode compartment 20 side and the positive electrode compartment 22 side of the battery, respectively.

The redox flow battery system 10 may further include a first bipolar plate 36 and a second bipolar plate 38, each positioned along a rear-facing side, e.g., opposite of a side facing the separator 24, of the negative electrode 26 and the positive electrode 28, respectively. The first bipolar plate 36 may be in contact with the negative electrode 26 and the second bipolar plate 38 may be in contact with the positive electrode 28. In other examples, however, the bipolar plates may be arranged proximate but spaced away from the electrodes within the respective electrode compartments. In either case, the bipolar plates 36 and 38 may be electrically coupled to the terminals 40 and 42, respectively, either via direct contact therewith or through the negative and positive electrodes 26 and 28, respectively. The IFB electrolytes may be transported to reaction sites at the negative and positive electrodes 26 and 28 by the first and second bipolar plates 36 and 38, resulting from conductive properties of a material of the bipolar plates 36, 38. Electrolyte flow may be assisted by the negative and positive electrolyte pumps 30 and 32, facilitating forced convection through the first redox flow battery cell 18. Reacted electrochemical species may be directed away from the reaction sites by the combination of forced convection and the presence of the first and second bipolar plates 36 and 38.

As illustrated in FIG. 1, the first redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and may induce a current through a current collector while the reactions are sustained. The amount of energy stored by a redox battery is limited by the amount of electroactive material available in electrolytes for discharge, depending on the total volume of electrolytes and the solubility of the electroactive materials.

The flow battery system 10 may further include the integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte including electroactive materials, and the positive electrolyte chamber 52 holds positive electrolyte including electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. FIG. 1 further illustrates the fill height 112 of storage tank 110, which may indicate the liquid level in each tank compartment. FIG. 1 shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the first redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. As such, the stored hydrogen gas can aid in purging other gases from the multi-chamber storage tank 110, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 shows the spill over-hole 96, which creates an opening in the bulkhead 98 between gas head spaces 90 and 92, and provides a means of equalizing gas pressure between the two chambers. The spill over hole 96 may be positioned a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank 110 can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber 52 includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber 52 independently or together. For example, in response to an electrolyte temperature decreasing below a threshold temperature, the controller 88 may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. The one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers 50, 52 in response to a liquid level decreasing below a solid fill threshold level. Said another way, controller 88 may activate the one or more heaters in the negative and positive electrolyte chambers 50, 52 only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further still, one or more inlet connections may be provided to each of the negative and positive electrolyte chambers 50, 52 from a field hydration system (not shown). In this way, the field hydration system can facilitate commissioning of the redox flow battery system, including installing, filling, and hydrating the system, at an end-use location. Furthermore, prior to its commissioning at the end-use location, the redox flow battery system may be dry-assembled at a battery manufacturing facility different from end-use location without filling and hydrating the system, before delivering the system to the end-use location. In one example, the end-use location may correspond to the location where the redox flow battery system 10 is to be installed and utilized for on-site energy storage. In other words, it is anticipated that, once installed and hydrated at the end-use location, a position of the redox flow battery system 10 becomes fixed, and the redox flow battery system 10 is no longer deemed a portable, dry system. Thus, from the perspective of a redox flow battery system end-user, the dry portable redox flow battery system 10 may be delivered on-site, after which the redox flow battery system 10 is installed, hydrated and commissioned. Prior to hydration, the redox flow battery system 10 may be referred to as a dry, portable system, the redox flow battery system 10 being free of or without water and wet electrolyte. Once hydrated, the redox flow battery system 10 may be referred to as a wet non-portable system, the redox flow battery system 10 including wet electrolyte.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the first battery cell 18, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples, the rebalancing reactors 80 and 82 may include flow-through type reactors that are capable of contacting the hydrogen gas and the electrolyte liquid and carrying out the rebalancing reactions in the absence a packed catalyst bed.

During operation of the redox flow battery system 10, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. In another example, sensors 62 and 60 may each include one or more electrolyte level sensors to indicate a level of electrolyte in the positive electrolyte chamber 52 and the negative electrolyte chamber 50, respectively. As another example, sensors 72 and 70, illustrated in FIG. 1, may monitor positive electrolyte and negative electrolyte conditions at the positive electrode compartment 22 and the negative electrode compartment 20, respectively. The sensors 72, 70 may be pH probes, optical probes, pressure sensors, voltage sensors, etc. Sensors may be positioned at other locations throughout the redox flow battery system 10 to monitor electrolyte chemical properties and other properties.

For example, a sensor may be positioned in an external acid tank (not shown) to monitor acid volume or pH of the external acid tank, wherein acid from the external acid tank is supplied via an external pump (not shown) to the redox flow battery system 10 in order to reduce precipitate formation in the electrolytes. Additional external tanks and sensors may be installed for supplying other additives to the redox flow battery system 10. For example, various sensors including, temperature, conductivity, and level sensors of a field hydration system may transmit signals to the controller 88. Furthermore, controller 88 may send signals to actuators such as valves and pumps of the field hydration system during hydration of the redox flow battery system 10. Sensor information may be transmitted to a controller 88 which may in turn actuate pumps 30 and 32 to control electrolyte flow through the first battery cell 18, or to perform other control functions, as an example. In this manner, the controller 88 may be responsive to, one or a combination of sensors and probes.

Redox flow battery system 10 may further include a source of hydrogen gas. In one example, the source of hydrogen gas may include a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow-controlling device (which may be controlled by controller 88) may regulate the flow of the hydrogen gas from integrated multi-chambered electrolyte storage tank 110. The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electroactive species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electroactive species.

For example, an increase in pH of the negative electrolyte chamber 50, or the negative electrode compartment 20, may indicate that hydrogen is leaking from the redox flow battery system 10 and/or that the reaction rate is too slow with the available hydrogen partial pressure, and controller 88, in response to the pH increase, may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by protons, generated at the positive side, crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system 10. For example, the time period may be reduced if the recirculation rate is high, and local changes in concentration (e.g., due to side reactions or gas leaks) may quickly be measured since the time constants may be small.

Figure 2:
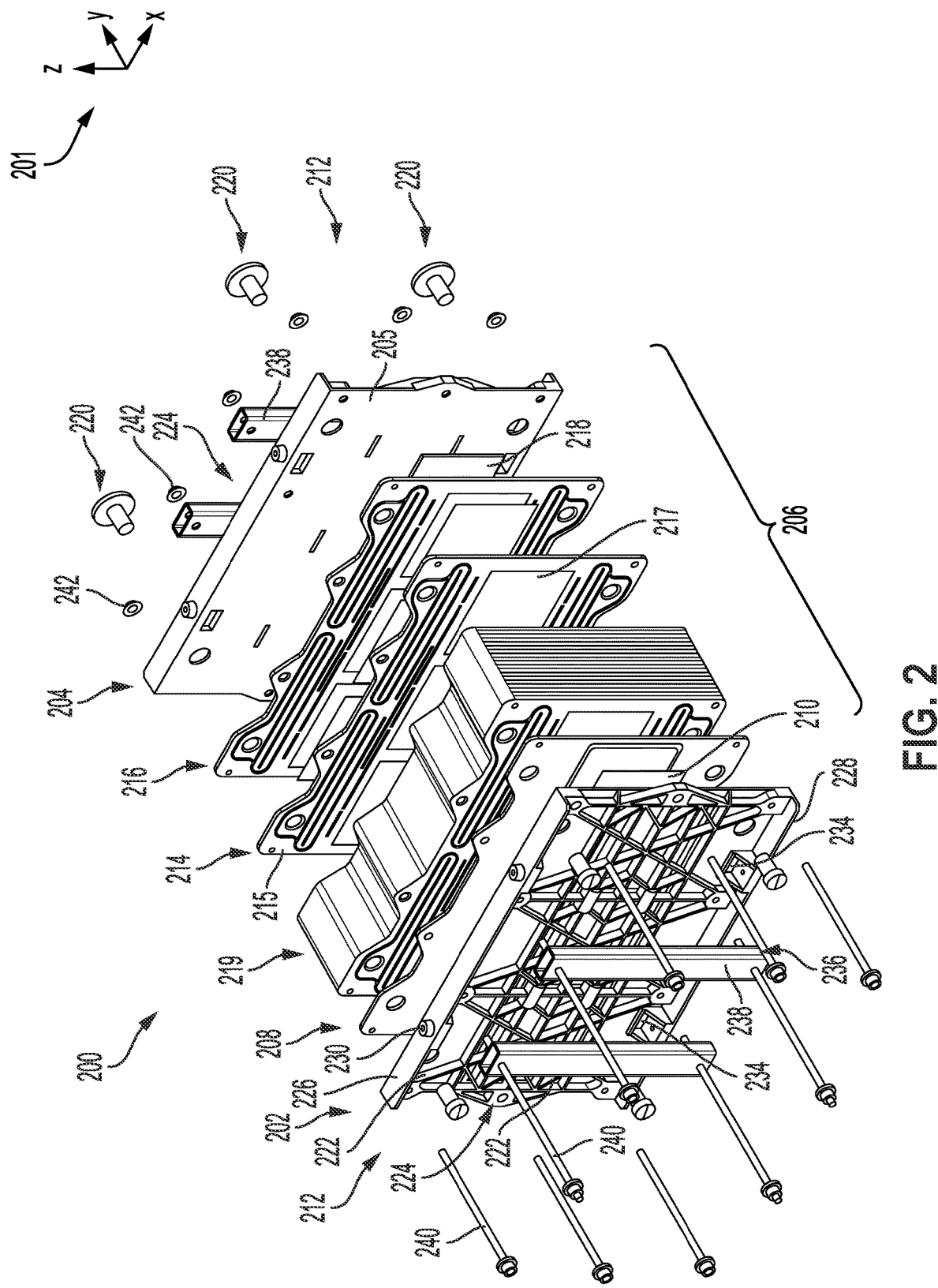
FIG. 2 shows an exploded view of an example of a redox flow battery with a compression assembly.

FIG. 2 shows an example of a redox flow battery 200 (e.g., iron redox flow battery (IFB)) having a first pressure plate 202 and a second pressure plate 204 with a cell stack 206 positioned therebetween. Specifically, interior sides 205 of the pressure plates may be designed to interface with opposing sides of the cell stack 206. It will be understood that the redox flow battery 200, shown in FIG. 2, as well as the other redox flow batteries and systems described herein are examples of the redox flow battery system 10, illustrated in FIG. 1. Thus, structural and/or functional features of the redox flow battery system 10, shown in FIG. 1, may be exhibited in the other redox flow batteries and battery systems described herein or vice-versa.

Continuing with FIG. 2, the redox flow battery 200 may not rely on an outer housing to structurally reinforce battery components, which may otherwise add weight and cost to the battery. Rather, the redox flow battery provides a compact system synergistically supporting as well as compressing the cell stack in the battery. Therefore, the flow battery's cost and profile may be reduced. Consequently, battery systems incorporating multiple battery modules may be more cost effectively and space efficiently manufactured, allowing for efficient battery system scaling, if desired.

An axis system 201 is provided in FIGS. 2-25 for reference. The z-axis may be parallel to a gravitational axis. The y-axis may be a longitudinal axis and/or the x-axis may be a lateral axis. However, other orientations of the axes may be used, in other embodiments.

The cell stack 206 includes a first endplate 208 positioned inside of the first pressure plate 202 and in face-sharing contact with an interior surface of the first pressure plate 202. A first current collector 210, configured to flow electrical current, may be arranged between the first endplate 208 and the first pressure plate 202. The first and second pressure plates 202, 204 are positioned on opposing terminal ends 212 of the redox flow battery 200.

In the cell stack 206, a first bipolar plate assembly 214 is arranged between the first endplate 208 and a second endplate 216 of the first cell stack 206. Additionally, bipolar plate assemblies 219 are shown stacked along the y-axis. The bipolar plate assemblies include a plurality of frame plates 215 stacked along the y-axis. The plurality of frame plates 215 provide structural support to the cell stack 206. Each frame plate of the plurality of frame plates 215 may be similarly configured to frame a cell of the cell stack. Each cell includes at least one bipolar plate 217 inserted into at least one opening of each frame plate. Furthermore, the bipolar plate is positioned between a negative electrode and a positive electrode of each cell, the electrodes arranged along opposite faces of the bipolar plate. In addition, the negative electrode is positioned between the bipolar plate and a membrane separator (e.g., the separator 24 of FIG. 1). In this way, each frame plate assembly has a stack of components including the membrane separator, the negative electrode, the bipolar plate, and the positive electrode, and the stack of components is repeated with each successive frame plate assembly in the cell stack 206. However, it will be understood that other suitable cell stack arrangements may be deployed, in other examples.

The second endplate 216 may be in face-sharing contact with the second pressure plate 204. A second current collector 218 may be arranged between the second endplate 216 and the second pressure plate 204.

FIG. 2 shows a plurality of flow ports 220. The flow ports 220 are designed to flow electrolyte (e.g., positive or negative electrolyte) into and out of the cell stack 206. As such, the flow ports 220 are shown extending through openings in the second pressure plate 204.

The first and second pressure plates 202, 204 are designed to both structurally reinforce the redox flow battery 200 and apply a preload force to the cell stack, when assembled. To accomplish the structural reinforcement, ribs 222, hereinafter reinforcing ribs, extend down outer sides 224 of the first and second pressure plates 202, 204. To elaborate, the reinforcing ribs 222 may extend laterally and/or vertically across the plates to tune the structural support according to end-use design objectives. Furthermore, the reinforcing ribs 222 are shown intersecting one another to increase structural integrity of the arrangement of ribs as well as provide a compact plate arrangement. In some examples, additional reinforcement structures, such as racking assemblies, may be omitted from the system due to the structural reinforcement provided by the pressure plates. In this way, the pressure plates can be self-supporting.

The first and/or second pressure plates 202, 204, may be manufactured out of a metal (e.g., aluminum, steel, titanium, etc.). In one specific example, the pressure plates may be constructed out of aluminum to increase the plate's strength to weight ratio when compared to steel plates, for instance. As such, in one use-case example, aluminum pressure plates may be used to decrease the weight of the battery while maintaining a targeted structural integrity. The use of aluminum pressure plates may substantially reduce (e.g., prevent) electromagnetic interaction between the pressure plates and the cell stack in comparison to steel plates. Further, in some examples, the pressure plates may be cast to even further improve plate structural integrity in comparison to manufacturing methods where multiple plate sections are welded to one another. Nevertheless, milling and/or other suitable plate manufacturing techniques may be used, in other examples. It will be understood that casting or milling the pressure plates allows the plates to form monolithic structures, providing increased component strength.

Figures 3, 4:
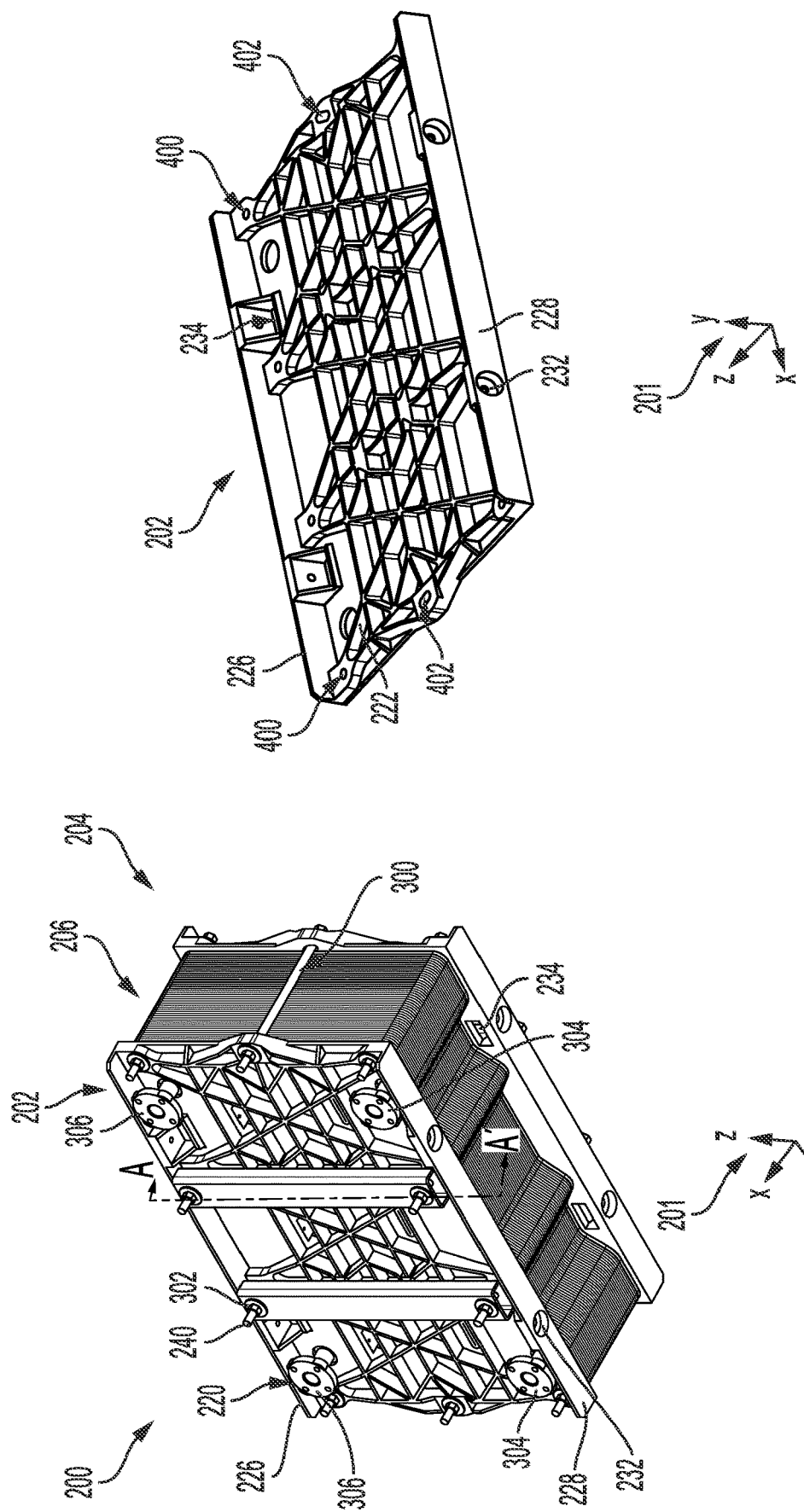
FIG. 3 shows an assembled view of the redox flow battery, depicted in FIG. 2.
FIG. 4 shows a pressure plate included in the redox flow battery, depicted in FIG. 3.

The pressure plates 202, 204 are shown including an upper flange 226 and a lower flange 228, each extending outward away from the cell stack 206. Specifically, in the illustrated example, the flanges 226 and 228 are horizontally arranged. However, other flange contours have been envisioned. For instance, the flanges may have a non-planar profile and/or may not be horizontally aligned. Protrusions 230 are included in the upper flange 226. Detents 232, shown in FIG. 3, are included in the lower flange 228. However, in other examples, the lower flange may include protrusions and the upper flange may include detents or each flange may include both protrusions and detents. It will be understood that the protrusions 230 and detents 232 are configured to mate with corresponding protrusions and detents in batteries placed above or below the redox flow battery 200. The protrusions and detents may be rounded in a horizontal cross-section to allow for smooth mating of the protrusions and detents. However, other shapes of the protrusions and detents have been contemplated such as polygonal shapes.

The pressure plates 202, 204 may include a plurality of forklift openings 234 allowing a forklift to engage the pressure plates during battery construction, installation, servicing, etc. Consequently, the battery units may be efficiently manipulated via forklifts, if desired. The forklift openings may be sized to accommodate extensions of forks in a forklift machine to mate therewith. However, in other examples, adapters may be placed on the ends of the forks in the forklift to facilitate lifting of the battery using a pressure plate. The forklift openings are shown longitudinally extending through the pressure plates. However, other orientations of the forklift openings have been envisioned. The detents 232 are shown vertically aligned with the forklift openings 234. Aligning the detents and forklift openings in this manner may allow the detents and protrusions to be easily aligned during battery stacking. However, the detents and the forklift openings may have alternate relative positions, in other examples.

The redox flow battery 200 include a compression assembly 236 designed to exert preload forces on the cell stack 206 to reduce deflection of the cell stack (e.g., active area of the cell stack) during battery operation. The compression assembly 236 includes leaf springs 238 extending along outer sides 224 of the pressure plates 202, 204. Specifically, in the illustrated example, the leaf springs 238 extend vertically down the side of the plates. However, in other examples, the springs may extend laterally across the plates or in a diagonal arrangement where the springs extend both vertically and laterally. It will be appreciated, that the expected direction of stack deformation may inform the arrangement of the leaf springs 238. As such, in one use-case the leaf springs are vertically aligned to accommodate for longitudinal expansion of the stack. The leaf springs 238 may be constructed out of steel, in one instance. However, the springs may be constructed out of other suitable materials such as titanium or other metals, polymeric materials, combinations thereof. Material cost, strength, and flexion characteristics may be taken into account when selecting the material(s) used to construct the leaf springs. Therefore, in certain use-cases, constructing the springs out of steel may provide desired flexion characteristics at a lower cost than other metals.

The redox flow battery 200 further includes a plurality of tie rods 240. The tie rods 240 are designed to extend through the leaf springs 238, pressure plates 202, 204, and cell stack 206. Other tie rods may extend through the pressure plates 202, 204 as well as the cell stack 206 and may not pass through the leaf spring 238. Nuts 242 designed to threadingly engage the tie rods 240 to allow compression to be exerted on the cell stack 206, are included in the redox flow battery 200.

FIG. 3 illustrates the redox flow battery 200 in an assembled configuration. A portion of the tie rods 240 are shown extending through the leaf springs 238. To elaborate, the tie rods 240 extend through upper and lower sections of the leaf springs 238 to facilitate spring flexion. Additional tie rods 240 are shown extending through the pressure plates 202, 204 and the cell stack 206. Side bolts 300, described in greater detail herein, are shown extending through the pressure plates 202, 204. Heads 302 of the tie rods 240 and the nuts 242, shown in FIG. 2, coupled to the tie rods may be tightened to allow cell stack compression to be set during battery assembly.

The forklift openings 234 are shown in FIG. 3 vertically offset from the cell stack 206, avoiding cell stack interference with the forklift. In this way, forks may be slid below or above a portion of the cell stack 206. As such, the chance of forks in a forklift striking the cell stack is reduced. Alternatively, the forklift openings may be aligned with the cell stack which may however pose impediments to efficient movement of the cell stacks using a forklift or other machinery.

FIG. 3 illustrates the flow ports 220 that enable electrolyte flow into and out of the cell stack 206. Specifically, in one example, the ports 304 may be inflow ports and the ports 306 may be outflow ports. However, other battery inflow and outflow schemes have been contemplated. To elaborate, a positive electrolyte inflow port and a negative electrolyte inflow port may be provided in the redox flow battery 200. Likewise, a positive electrolyte outflow port and a negative electrolyte outflow port may be provided in the redox flow battery 200. FIG. 3 shows the upper flange 226 and the lower flange 228 in the first pressure plate 202. Detents 232 in the lower flange 228 are illustrated in FIG. 3. Cutting plane A-A' indicating the cross-section of FIG. 5, is illustrated in FIG. 4.

FIG. 4 shows a detailed view of the first pressure plate 202. The reinforcing ribs 222, upper flange 226, lower flange 228, detents 232, and forklift openings 234 are again illustrated. FIG. 4 shows openings 400 for the tie rods 240, depicted in FIG. 3. FIG. 4 further depicts slots 402 for the side bolts 300, illustrated in FIG. 3. The slots 402 allow for a larger tolerance range in stack width, and are discussed in greater detail herein in reference to FIGS. 7 and 8.

Figure 5:
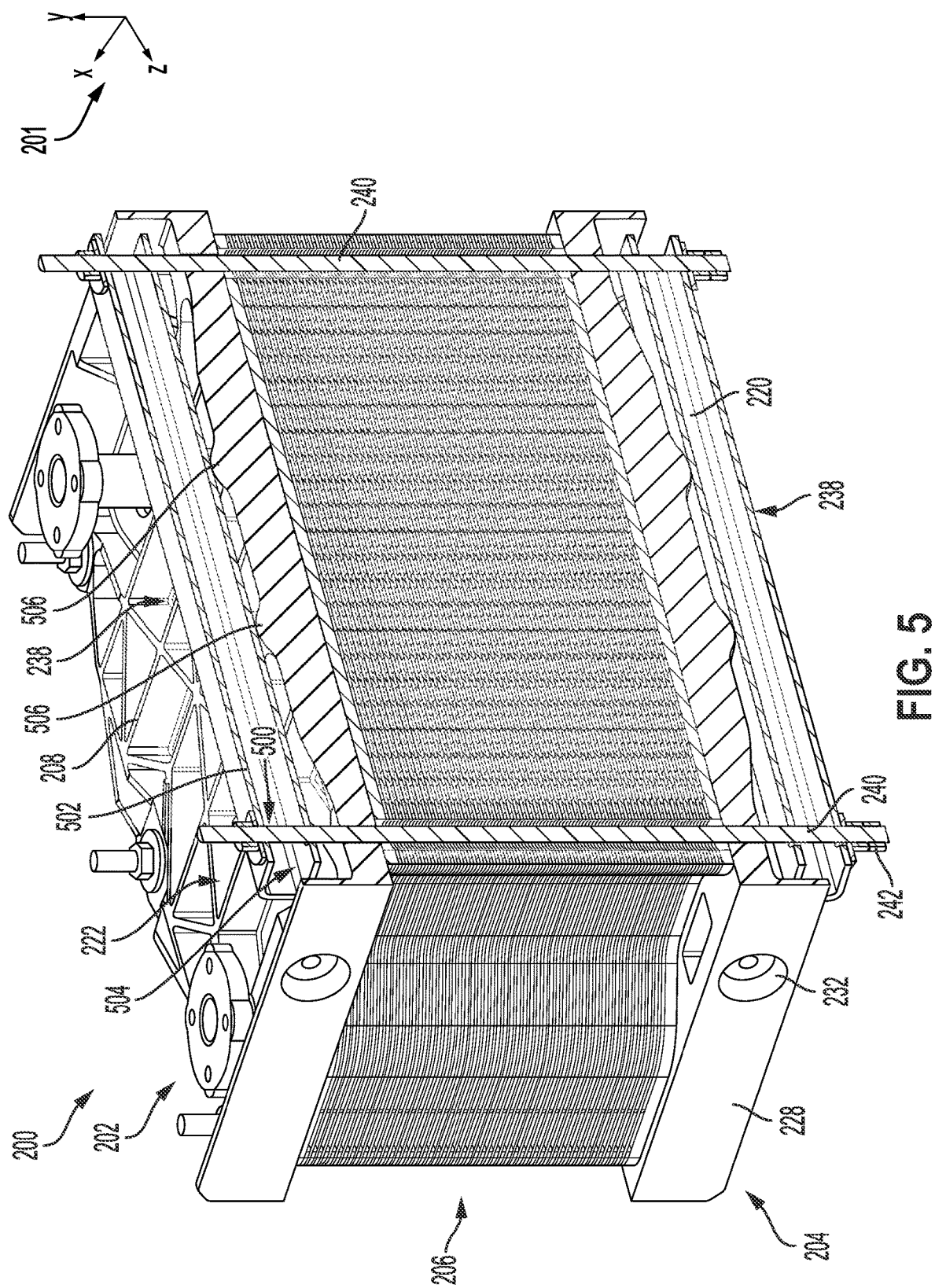
FIG. 5 shows a cross-sectional view of the redox flow battery, shown in FIG. 3.

FIG. 5 shows a cross-sectional view of the redox flow battery 200. The pressure plates 202, 204, cell stack 206, leaf springs 238, tie rods 240, and nuts 242 are again depicted. The tie rods 240 may specifically extend through openings 500 in the leaf springs 238 for cell stack compression. To accommodate for leaf spring flexion, the tie rods may be positioned on opposing sides of the leaf springs.

The leaf springs 238 are illustrated as tube leaf springs in FIG. 5, which may provide a desired balance of structural integrity and flexion. However, flat bar type leaf springs may be used, in alternate examples. The tube leaf springs include walls 502 bounding an interior cavity 504. Wall thickness and profiles may be selected to achieve different spring constants. Using tube leaf springs in the battery enables the battery cell stack to be compressed in a space efficient manner. Tube leaf springs may have a higher moment of inertia than other types of spring and experience a decreased amount of stress under deflection, when compared to other types of springs, providing a more robust spring. However, in other examples, other suitable types of leaf springs may be deployed in the battery, such as leaf springs with leaves sequentially stacked in layers.

The pressure plates 202, 204 may have fulcrums 506. The fulcrums 506 serve as a location for the reaction force during cell stack compression. In this way, the cell stack loading may occur in targeted locations. Specifically, the fulcrums 506 are positioned vertically between pairs of tie rods 240 extending through each of the springs 238. FIG. 5 further shows the detents 232 in the flange 228 of the pressure plate 204. It will be appreciated that the reinforcing ribs 222 and fulcrums 506 in the pressure plates 202, 204 may be synchronously constructed via casting to streamline manufacturing and reduce costs, in one example. In this way, manufacturing can be further simplified to drive down costs. However, milling or other suitable manufacturing techniques may be used to form the fulcrums, in other examples.

Figure 6:
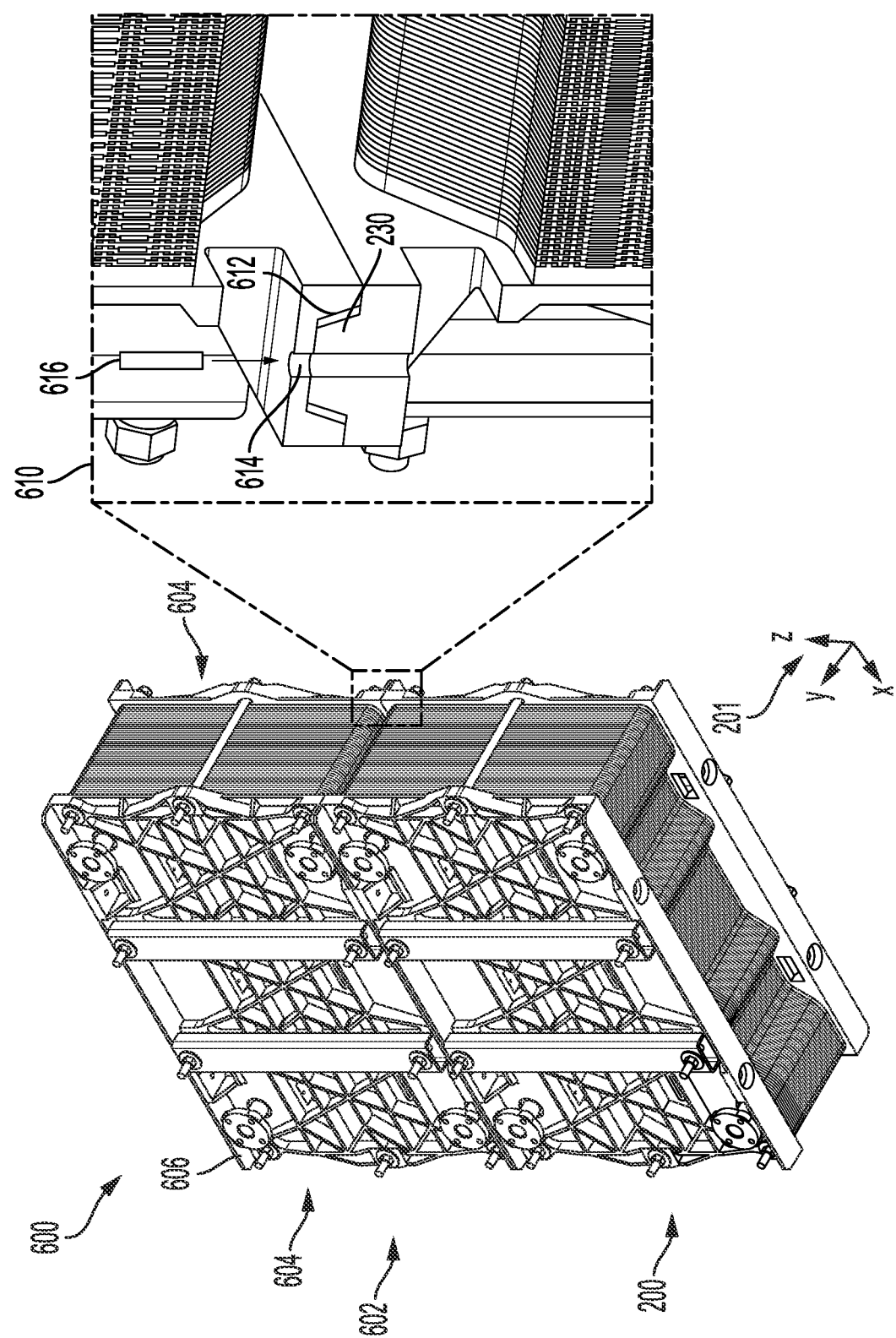
FIG. 6 shows an example of a battery system where a second redox flow battery is stacked on the redox flow battery, depicted in FIG. 3.

FIG. 6 shows an example of a second redox flow battery 602 that is stacked on top of the redox flow battery 200 in a battery system 600. The second redox flow battery 602 may be similar in form and function to the redox flow battery 200. Thus, the second redox flow battery 602 includes pressure plates 604 with flanges 606 having detents as well as protrusions. As previously discussed, mating of detents and protrusions in the flanges of the pressure plates in different batteries allow for unit stackability. Stacking the batteries in this manner allows the sizing of the battery system to be efficiently scaled up, as desired. Consequently, the battery system can be quickly adapted to meet end-use design parameters (e.g., power targets, storage capacity targets in the case of a hybrid redox flow battery). It will be appreciated that the multiple batteries may be used in the system to achieve energy demands for a wide variety of applications such as grid storage, residential energy storage, industrial energy storage, etc. Thus, the system may supply energy to a common energy consuming device, in one example.

An expanded side view of the battery system 600 is indicated at 610. The expanded view shows one of the protrusions 230 in the redox flow battery 200 mated with a corresponding detent 612 in the second redox flow battery 602.

The protrusions 230 and the detents 612 may taper in a vertical direction. Tapering of the protrusions and the detents allows the components to be guided into mating engagement, reducing the chance of battery misalignment while stacking. As such, the likelihood of user error during battery installation, servicing, etc., is reduced. In other words, the mating detents and protrusions serve as a "pokayoke" (error reducing mechanism).

The protrusion 230 and detent 612, depicted in FIG. 6, are also shown having aligned (e.g., vertically aligned) thru-holes 614. A schematically illustrated attachment device 616 (e.g., bolt such as a pin bolt, screw, etc.) may extend through the thru-holes 614, enabling the redox flow battery 200 and the second flow battery 602 to be more securely attached, further reducing the chance of battery unit misalignment and structurally reinforcing the system.

Figure 8:
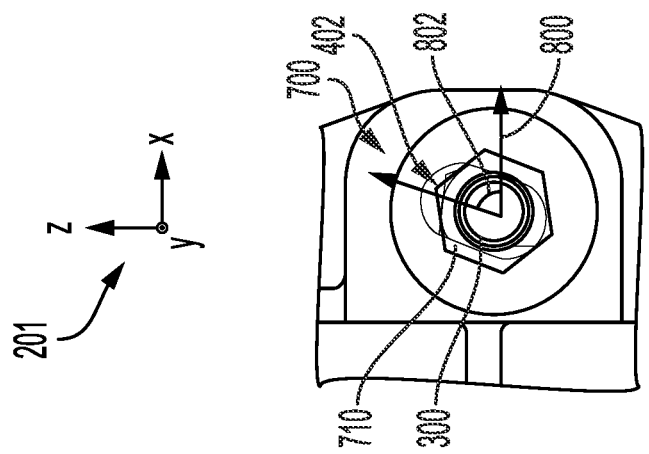
FIG. 8 shows a more detailed view of the side bolt cam assembly, depicted in FIG. 7.
Figure 7:
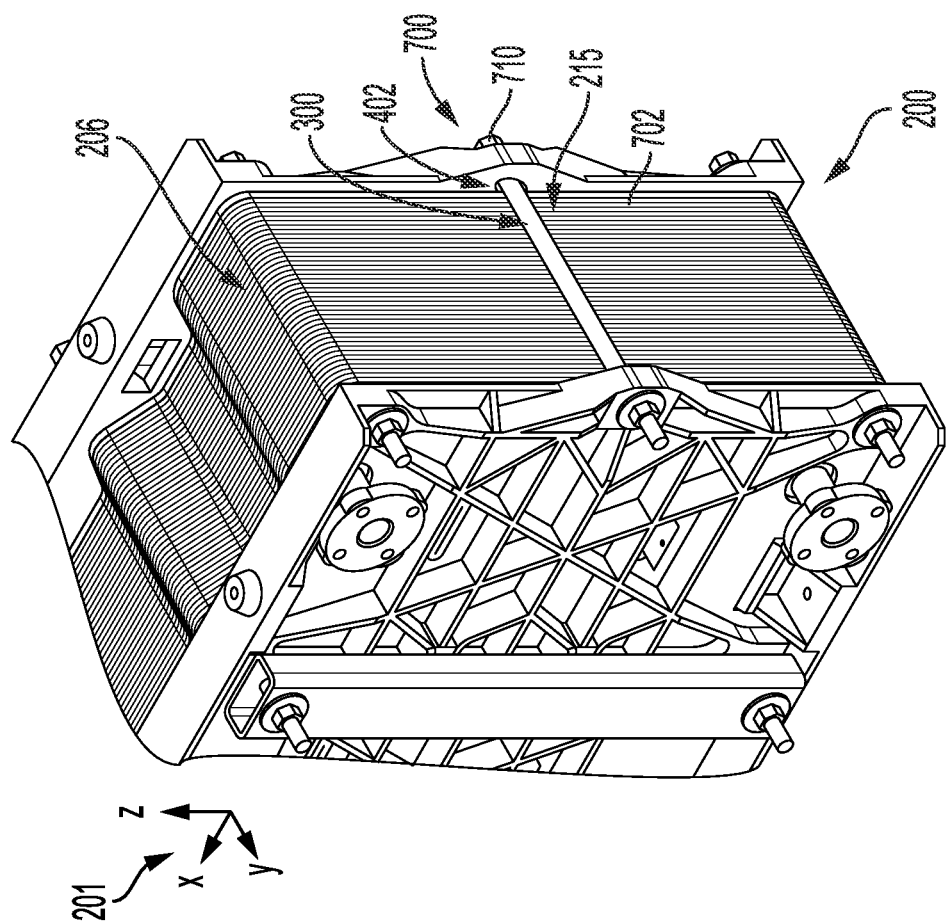
FIG. 7 shows a detailed view of the side bolt cam assembly included in the redox flow battery, depicted in FIG. 3.

FIGS. 7-8 show detailed views of a side bolt cam assembly 700 in the redox flow battery 200. The side bolt cam assembly 700 is designed to reduce deflection of the sidewalls 702 of the frame plates 215 during battery use. The side bolt cam assembly 700 is designed with lateral compliance to accommodate for lateral variances in cells in the cell stack. Slots 402 are positioned on opposing lateral sides of each pressure plate for operably receiving side bolts 300 therethrough. Nuts 710 threadingly engaging the side bolts 300 allow the longitudinal compression exerted by the side bolt cam assembly 700. The slots 402 may each be included in a similar vertical and lateral location in their respective pressure plate to allow the side bolts to longitudinally extend across the battery. However, dissimilar slots locations on the pressure plates have been contemplated. The side bolts 300 mate with the slots 402 which have an angle and length selected to allow for larger tolerance ranges of cell stack width, while also reducing lateral deflection of the cell stack (e.g., frames in the cell stack) during battery operation. It will be appreciated the lateral stack deflection may be caused thermal expansion and/or cell stack pressurization. Accommodating for variances in cell stack width enables the battery to be more easily assembled without the need to modify or replace cells in the stack having a lateral width that is larger than expected, for instance. When the redox flow battery 200 is assembled as previously described, the slots 402 are angled with regard to a lateral axis 800. The slot angle indicated at 802 in FIG. 8. In one example, the slot angle 802 may be within a range between 70 and 89 degrees. It will be appreciated that the slot angle may be selected by assessing the tradeoffs between lateral compliance and pressure plate movement. For instance, increasing the slot angle increases the lateral compliance of the compression structure while also increasing the chance of unwanted pressure plate movement. The abovementioned angle range may provide a desired balance between these two competing design parameters, in some cases.

The side bolts 300 may travel along the slots 402 upward and away from the stack with gravity biasing and urging the cam downward to a neutral position engaging the side of the cell stack. Nuts 710 secure the side bolt 300 to the adjacent pressure plate. As the nuts 710 are tightened to secure the side bolts to the pressure plates, the force required to move the cam along the slots increases. Accordingly, the side bolts 300 provide a predetermined clamping force, thereby allowing the force needed to move the side bolts 300 from their positions to be tuned.

Figure 9:
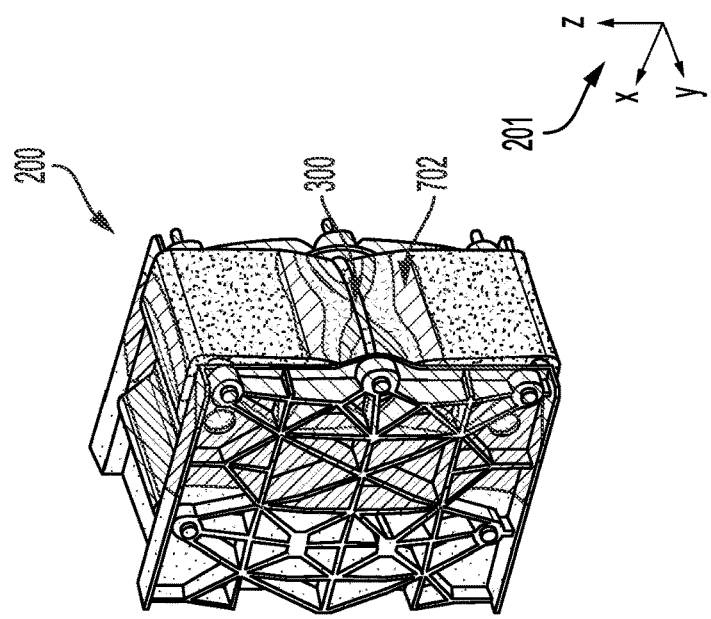
FIG. 9 shows a use-case example of thermal loading of the redox flow battery, depicted in FIG. 3.

Referring to FIG. 9, a use-case deformation diagram showing an example deformation of the redox flow battery 200 when pressurized and/or thermally loaded, is illustrated. During battery operation, the sidewalls 702 of the cell stack tend to extend outward toward the side bolts 300. The expanding sidewalls of the cell stack urge the side bolt outward, with the side bolt resisting this outward force. In this way, the side bolts 300 restrict excessive deflection of the sidewalls. Consequently, the battery may conform to a desired profile during use.

Figure 10:
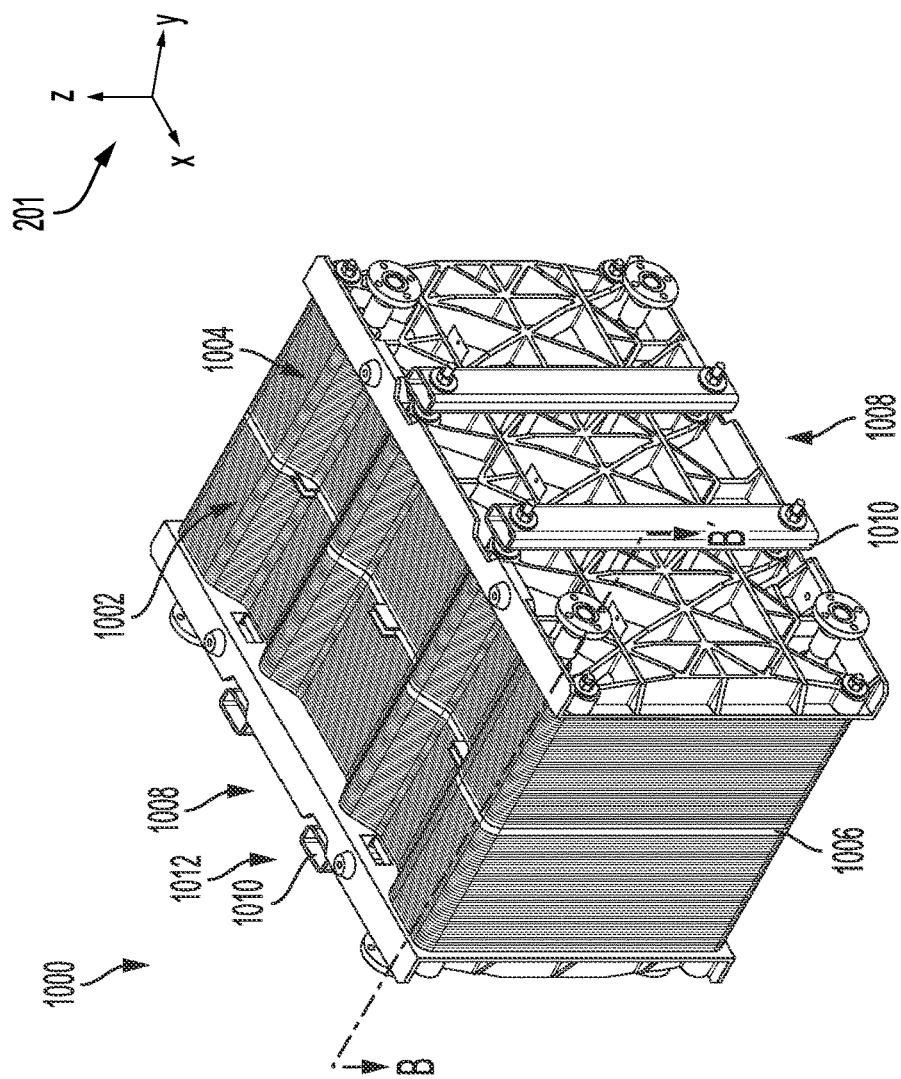
FIG. 10 shows a second example of a redox flow battery including multiple cell stacks.

FIG. 10 shows another example of a redox flow battery 1000. It will be appreciated that the redox flow battery 1000 shown in FIG. 10 includes similar features to the redox flow battery 200 illustrated in FIGS. 2-9. As such, redundant description is omitted for brevity.

The redox flow battery 1000 includes a first cell stack 1002 and a second cell stack 1004 divided via a sub-stack separator plate 1006. In this way, the number of cells in the battery can be increased, allowing for efficient upscaling of the battery system's power and in some cases storage capacity. In one example, each of the cell stacks may be similar in function and form. However, in other examples, the cell stacks may have variances in sizing, functionality, etc.

The redox flow battery 1000 includes pressure plates 1008 and leaf springs 1010 in a compression assembly 1012. The compression assembly 1012 and corresponding components may be similar to the compression assembly 236, shown in FIGS. 2-9. Using a similar compression assembly for a single and double cell stack battery arrangement can allow manufacturing cost reductions to be leveraged with regard to economies of scale. However, in other examples, the compression assemblies deployed in the single and double stack battery configurations may vary. The double cell stack battery configuration allows multiple cell stacks to use common hardware such as the compression assembly, pressure plates, and tie rods, to compress and structurally support the cell stacks. In this way, redundancies in the system can be reduced to drive down manufacturing costs as well as decrease the profile and weight of the battery system, if wanted.

Figure 11:
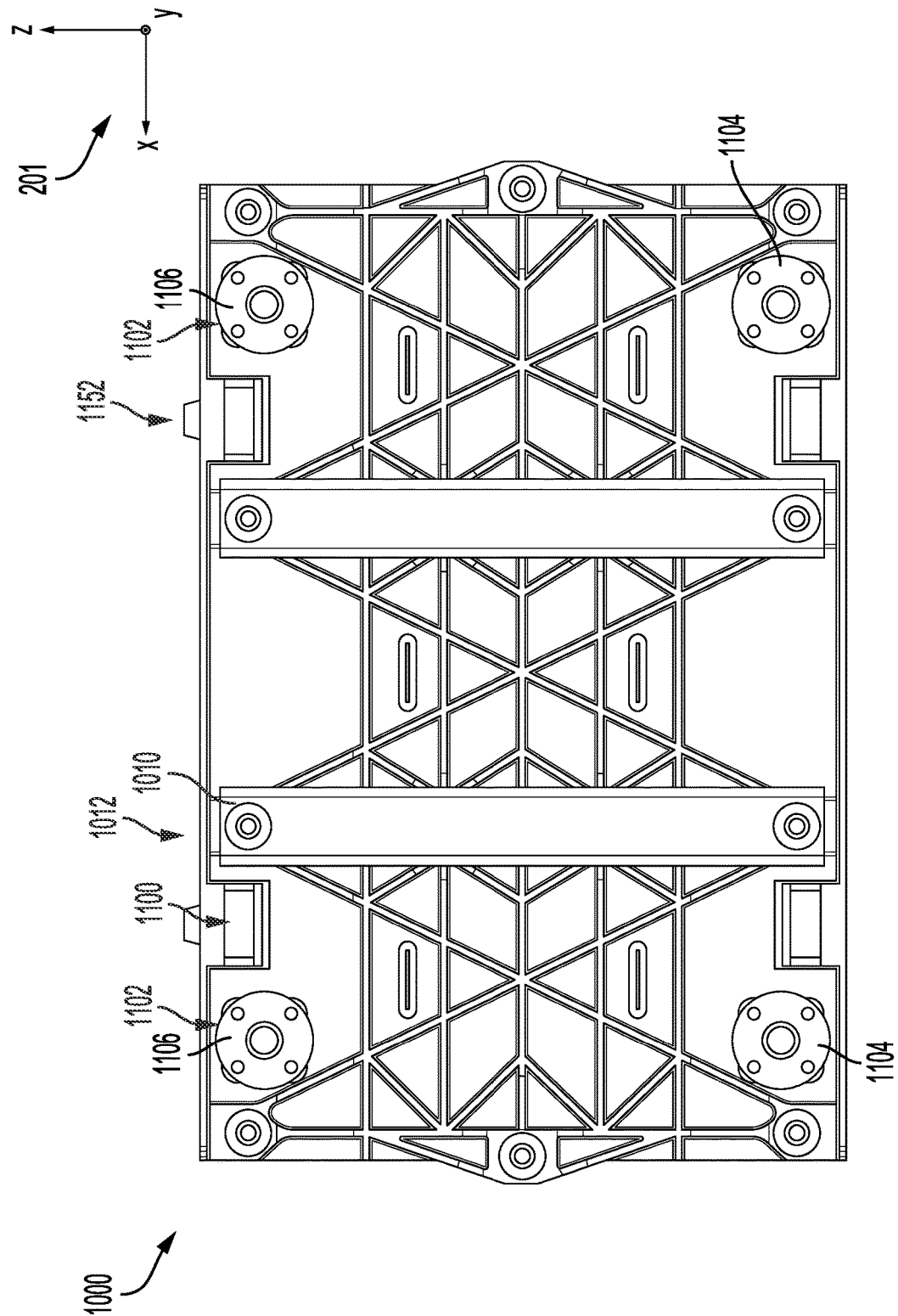
FIG. 11 shows a side view of the second example of the redox flow battery, depicted in FIG. 10.
Figure 12:
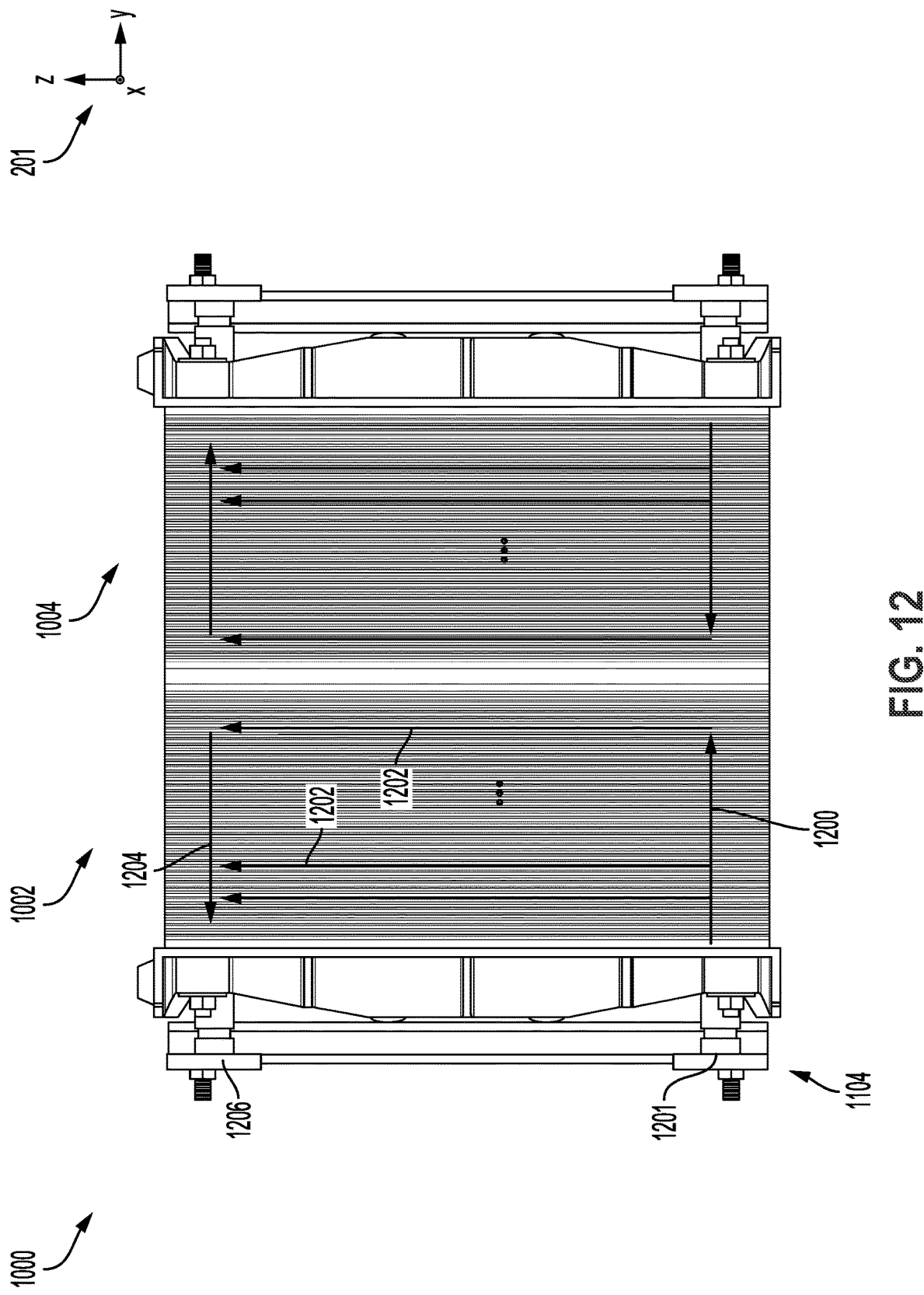
FIG. 12 shows a cross-sectional view of the second example of the redox flow battery, depicted in FIG. 10.

FIG. 11 shows a side view of the redox flow battery 1000. The pressure plates 1008 and the compression assembly 1012 with the leaf springs 1010, are again shown. Forklift openings 1100 included in the pressure plate 1008 are depicted in FIG. 11. However, the forklift openings may be omitted, in other examples. Electrolyte flow ports 1102 are also shown in FIG. 11. To elaborate, inlet ports 1104 are provided on a lower side of the pressure plate 1008. It will be understood that the inlet ports include a positive electrolyte inlet port and a negative electrolyte inlet port. However, alternate inlet and/or outlet port locations have been contemplated. The pressure plate on the opposing side of the redox flow battery 1000 may have a similar electrolyte flow port configuration. Cutting plane B-B' indicating the cross-section of FIG. 12, is depicted in FIG. 11. The inlet ports 1104 include a positive electrolyte inlet flow port and a negative electrolyte inlet flow port. Likewise, the outlet ports 1106 include a positive electrolyte outlet flow port and a negative electrolyte outlet flow port.

FIG. 12 shows a cross-sectional view of the redox flow battery 1000 where the general electrolyte flow paths in the first cell stack 1002 and the second cell stack 1004 are illustrated. To elaborate, the flow path of the negative electrolyte is shown. However, the flow path of the positive electrolyte may have a similar directionality to the path of the negative electrolyte. In other examples, dissimilar flow paths of the positive and negative electrolyte may be used.

Arrow 1200 indicates an initial direction of electrolyte flow into the first cell stack 1002 in a longitudinal direction from the inlet port 1201. As such, the electrolyte flow travels through sequential cells in the stack. Arrows 1202 indicates a direction of electrolyte flow vertically through the cell stack. Thus, electrolyte flows in parallel channels vertically traverses the first cell stack 1002. Arrow 1204 indicates a direction of electrolyte flow towards the outlet port 1206 in a longitudinal direction. In this way, negative electrolyte may be circulated in the first cell stack 1002. FIG. 12 shows the second cell stack 1004 exhibiting a similar flow pattern to the first cell stack 1002.

Additionally, a pump may be in fluidic communication with the inlet ports 1104 to allow for variations in electrolyte flow. The second cell stack may be coupled to a pump to achieve electrolyte flow adjustability. In one example, the first and second pumps may be controlled independently. However, coordinated pumping control strategies for the two pumps have been envisioned.

Figure 13:
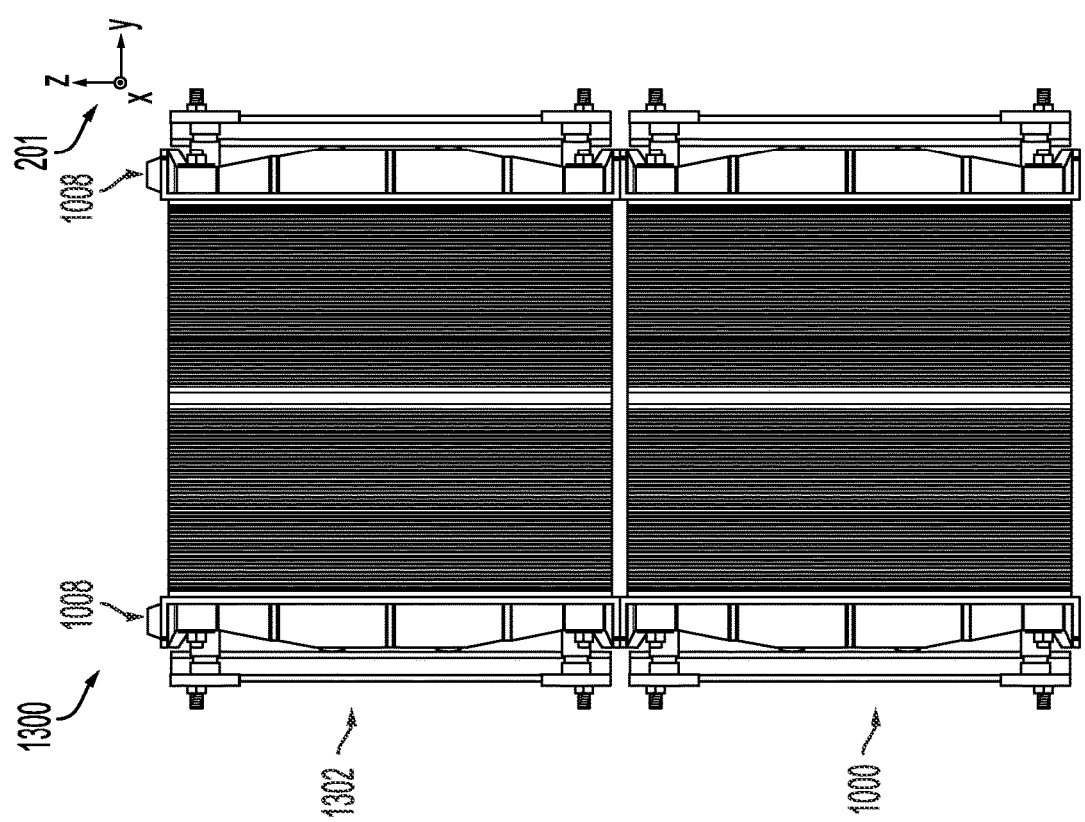
FIG. 13 shows a second example of a battery system where a second redox flow battery is stacked on the redox flow battery, depicted in FIG. 10.

FIG. 13 depicts a battery system 1300 where a second double stack battery 1302 is stacked on top of the redox flow battery 1000. In this way, the battery system's power and in some cases capacity can be further expanded. It will be appreciated that the protrusions 1152 in the pressure plates 1008, shown in FIG. 11 facilitate the efficient stacking of the battery modules, similar to the battery system 600, shown in FIG. 6. To elaborate, the protrusions 1152, shown in FIG. 11, mate with corresponding detents in the second double stack battery 1302.

Figure 14:
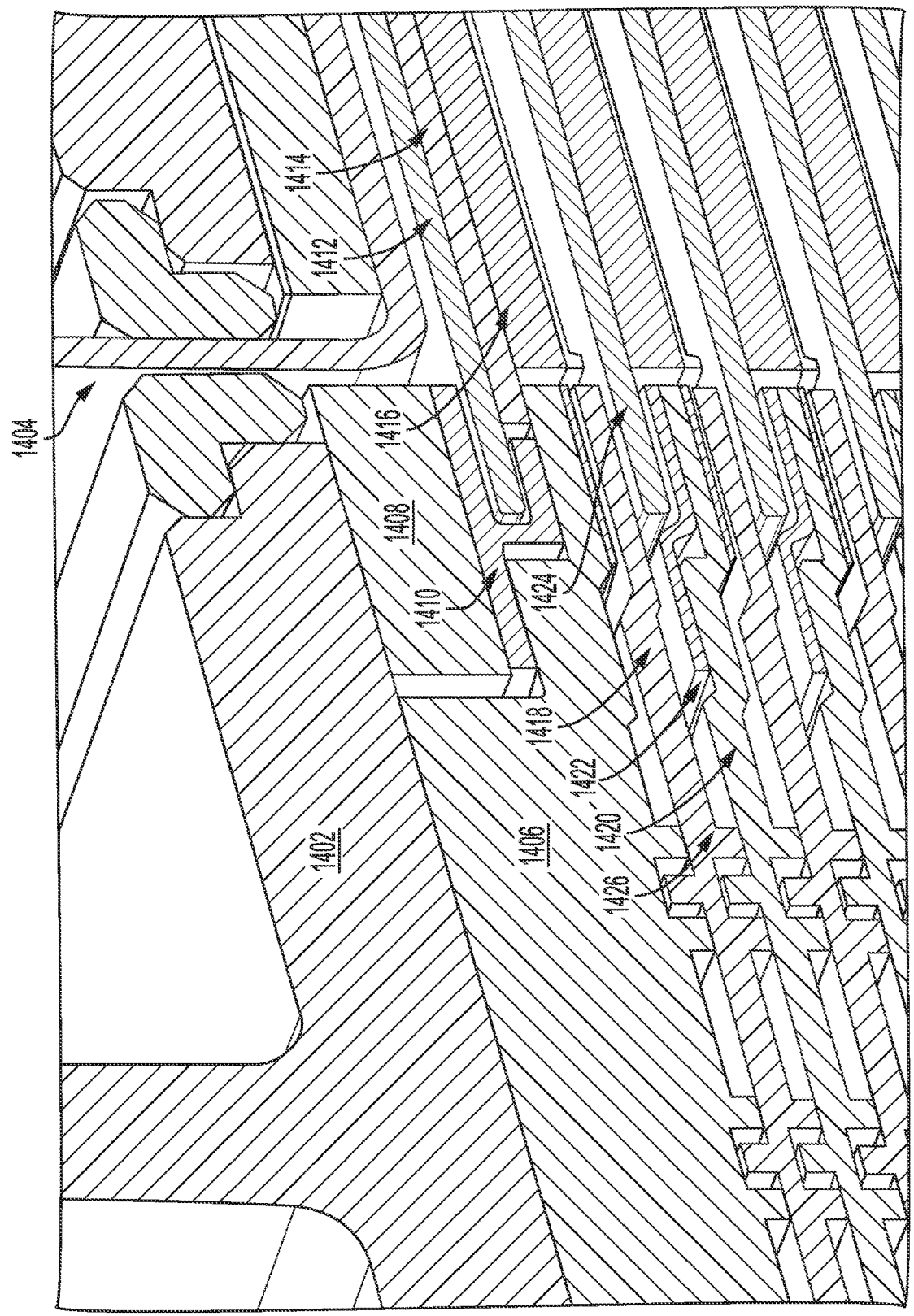
FIG. 14 shows a cross-sectional view of a section of an exemplary cell stack in a redox flow battery.

FIG. 14 shows a cross-sectional view of a portion of an exemplary cell stack 1400. It will be appreciated that the cell stack 1400 shown in FIG. 14 may in some examples share common functional and/or structural features with one or more of the other cell stacks described herein or vice versa.

The cell stack 1400 includes a pressure plate 1402. The pressure plate 1402 may be designed to exert a compressive force on interior cells in the stack, similar to the other pressure plates described herein. The cell stack 1400 includes a current collector 1404 allowing for energy transfer from the battery to selected external systems or vice versa. The cell stack 1400 further includes an endplate frame 1406 and a flange shim support 1408, in the illustrated example. However, in other examples, the flange shim may be omitted from the stack.

The cell stack 1400 may include a number of elastic features accommodating for differences in thermal expansion/contraction of different materials/components in the stack. The cell stack may therefore exhibit tuned compliance to reduce the likelihood of unwanted cell stack warping. Stack warping can affect flow patterns in the cells having the potential to decrease battery efficiency, output, and structural integrity. As such, incorporating elastic features to accommodate for cell stack warping diminishes (e.g., avoids) these impacts.

The elastic features may include an endplate elastic flange 1410. The cell stack 1400 may further include a conductive plate 1412 (e.g., graphite plate) mated with the endplate elastic flange 1410. The cell stack 1400 may further include another conductive plate 1414 in face sharing contact with the conductive plate 1412. It will be appreciated that the conductive plates 1412, 1414 may be monopolar plates, in some instances.

The cell stack 1400 may further include a layer of felt 1416 adjacent to the conductive plate 1414. However, in other instances, the felt layer may be omitted from the cell stack.

The cell stack 1400 further includes a membrane frame plate 1418 stacked (e.g., correspondingly mated) with the endplate frame 1406. The cell stack further includes a frame plate 1420 (e.g., bipolar frame plate) adjacent to and stacked on the membrane frame plate 1418. An elastic flange 1422 may be positioned between the membrane frame plate 1418 and the bipolar frame plate 1420. A conductive plate 1424 (e.g., bipolar conductive plate) is shown positioned between the elastic flange 1422 and the membrane frame plate 1418. In this way, the cell stack 1400 may support the conductive plate 1414. The bipolar frame plate 1420, elastic flange 1422, and the bipolar conductive plate 1414, may form a bipolar plate assembly 1426. The elastic flange 1422 allows for tuned compliance of the endplate frame in the stack. Thus, unequal expansion/contraction of the cell stack constituents may be managed using compliant interfaces between stack components.

As shown in FIG. 14, the cell stack 1400 further includes sequential layers of membrane frame plates, bipolar frame plates, elastic flanges, bipolar conductive plates, felt, etc. The number of layers in the stack may be selected based on desired system power and/or capacity, expected cell stack deformation, deflection, etc., caused by stack pressurization as well as stack thermal loading.

Figure 15:
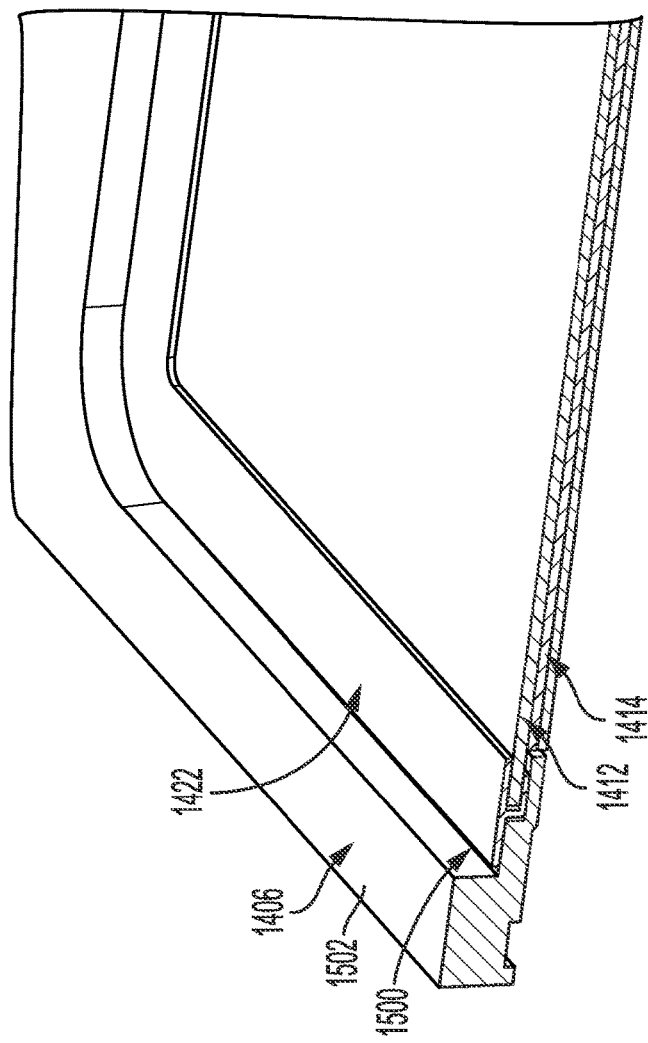
FIGS. 15-16 show detailed views of an endplate assembly in the cell stack, depicted in FIG. 14.

FIG. 15 shows a detailed view of the endplate frame 1406, the endplate elastic flange 1422, and the conductive plates 1412, 1414. As shown, the endplate elastic flange 1422 are located in a recess 1500 of the endplate frame 1406. The cell endplate elastic flange 1422 extends around a periphery of the conductive plates 1412, 1414. In some examples, the elastic flange 1422 may be offset from a peripheral flange 1502 of the endplate frame 1406. In this way, the elastic flange may not interfere with frame plate stacking.

Figure 16:
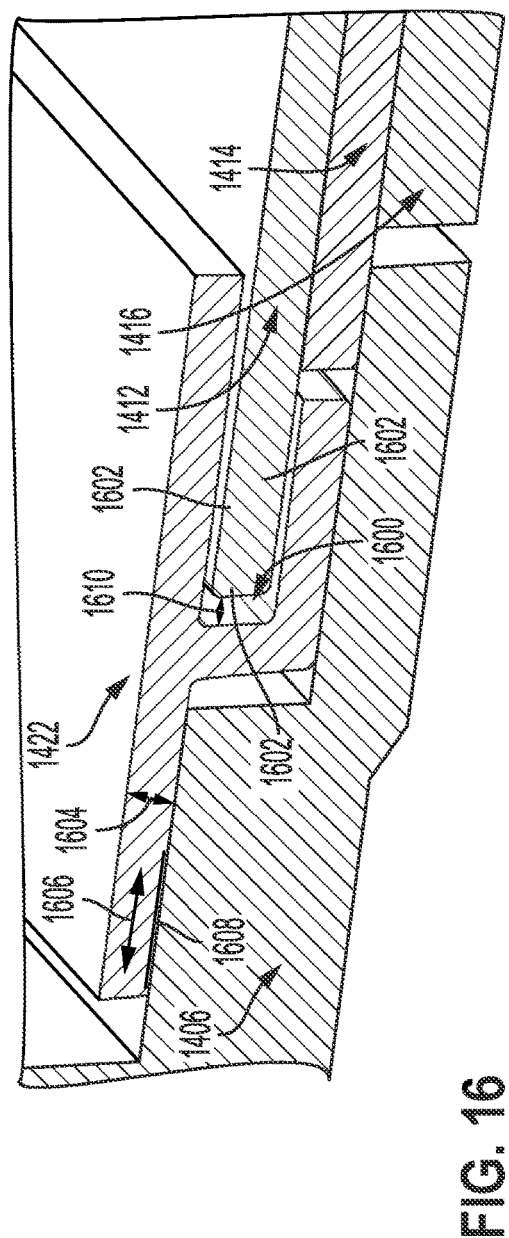

FIG. 16 shows a more detailed view of a portion of the endplate frame 1406, endplate elastic flange 1422, and the conductive plates 1412, 1414 (e.g., monopolar plates), and layer of felt 1416 are illustrated in FIG. 16. The endplate elastic flange 1422 is shown including a recess 1600 mated with a portion the conductive plate 1412. As specifically illustrated, the recess 1600 of the endplate elastic flange 1422 partially surrounds three sides 1602 of the conductive plate 1412. Thus, a double lap joint may be formed between the interface between the endplate elastic flange 1422 and the conductive plate 1412. As a result, the connection between the elastic flange and the conductive plate may be strengthened. However, in other examples, the endplate elastic flange 1422 may have another suitable profile such as a profile where the flange partially surrounds only two sides of the conductive plate.

The thickness 1604 of the elastic flange may be chosen to achieve a desired amount of compliance based on various parameters such as the size, layout, and material construction of other components in the cell stack. In one use-case example, the thickness 1604 may be in the range between 0.2 millimeters (mm) to 2 mm and/or the elastic flange may have a durometer range between 30A and 80A to achieve a desired flexibility. However, numerous suitable flange thicknesses and/or harnesses may be utilized.

The endplate elastic flange 1422 is designed for compliance in directions indicated via arrow 1606. Consequently, the likelihood of stack warping in an unwanted matter may be reduced.

The endplate frame 1406 and the endplate elastic flange 1422 may be heat welded to one another, indicated at 1608. In such an example, both the endplate frame 1406 and the endplate elastic flange 1422 may have monomers allowing for a stronger chemical bond when the components are heat welded. Adhesive bonding may, additionally or alternatively, be used to attach the endplate frame to the endplate elastic flange.

A gap 1610 may be retained between the endplate frame 1406 and the endplate elastic flange 1422 to allow for unequal thermal expansion/contraction of the different components. The gap 1610 enables stack warping to be strategically managed.

The conductive plate 1412 may be adhesively attached to the endplate elastic flange 1422 at the recess 1600. Additionally, the conductive plates 1412, 1414 may be coupled to one another via a suitable conductive adhesive.

The compliance of the endplate elastic flange 1422 may be achieved via an elastic material such as an elastomeric polymer (e.g., synthetic rubber, natural rubber, and the like). The elastic material, in one example, may be a thermoplastic vulcanizate (TPV) (e.g., Santoprene®), and both the bipolar plate elastic flange and frame may have a thermoplastic polymer (e.g., Polypropylene (PP) such as glass fiber filled PP). TPV flange construction may provide a targeted amount of resiliency, in some instances. Furthermore, constructing the frames out of PP provides a more chemically inert and lower cost construction. However, other frame materials may be used, in other examples.

Figure 17:
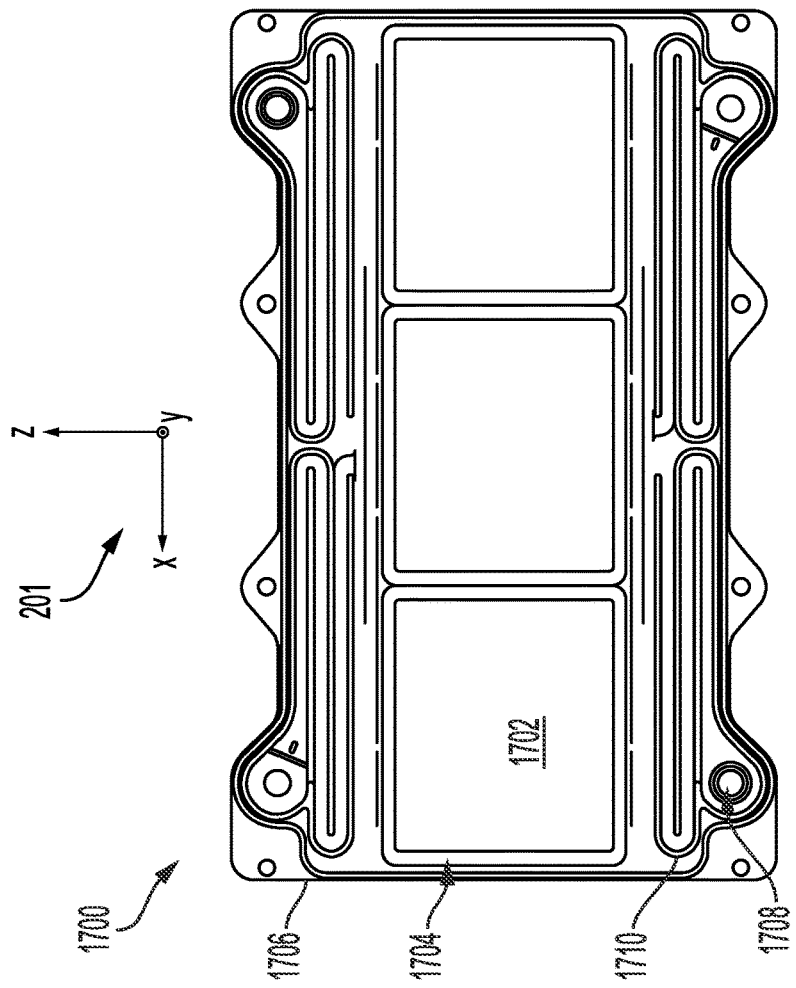
FIG. 17 shows a bipolar plate assembly.

FIG. 17 shows an example of a bipolar plate assembly 1700 that includes bipolar plates 1702, elastic flanges 1704, and bipolar frame plate 1706. It will be understood that the bipolar plate assembly 1700 may be included in the cell stack 1400, shown in FIG. 14. The bipolar plate assembly 1700 includes electrolyte ports 1708 and flows channels 1710 for directing electrolyte to the bipolar plates 1702.

Figure 18:
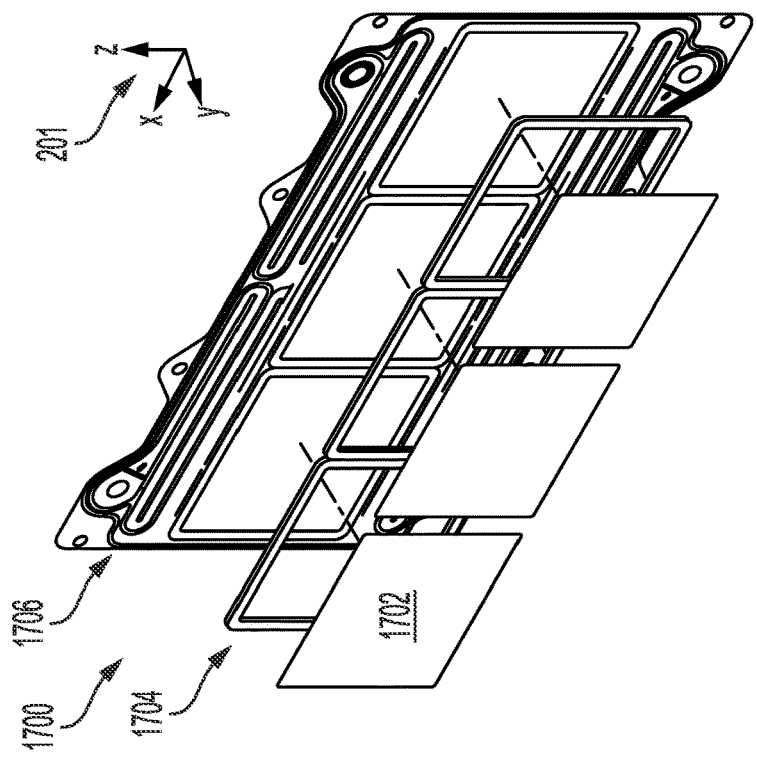
FIG. 18 shows an exploded view of the bipolar plate assembly, depicted in FIG. 17.

FIG. 18 shows an exploded view of the bipolar plate assembly 1700. The bipolar plates 1702, elastic flanges 1704, and bipolar frame plate 1706 are illustrated in FIG. 18. The bipolar plates 1702 may be nested in the flange 1704 of the bipolar frame plate 1706, when assembled. This arrangement may increase cell stack compactness as well as structurally reinforce the bipolar plates, to avoid plate deformation.

Figure 19:
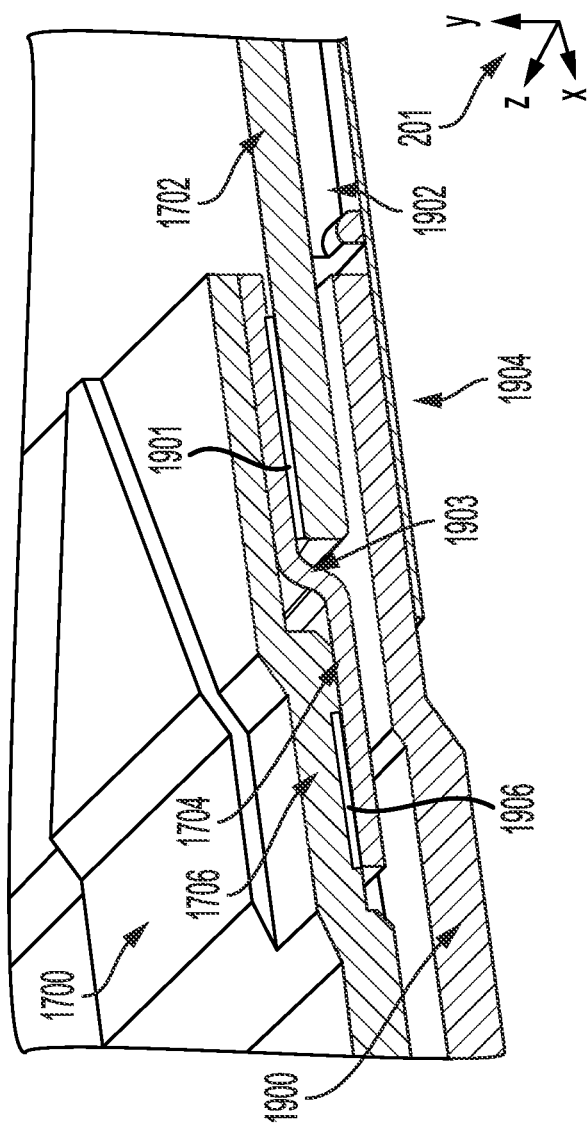
FIG. 19 shows a detailed cross-sectional view of a portion of the bipolar plate assembly, depicted in FIG. 17.

FIG. 19 shows a detailed cross-sectional view of the bipolar plate assembly 1700. The bipolar frame plate 1706, one of the elastic flanges 1704, and one of the bipolar plates 1702 are depicted. A membrane frame plate 1900 is shown in FIG. 19. A layer of adhesive 1901 may be applied between the bipolar plate 1702 and the elastic flange 1704. The elastic flange 1704 shown in FIG. 19 is in an S-shape. Thus, when formed in an S-shape, a section 1903 of the flange 1704 extends between two portions of the flange offset along the y-axis. Shaping the elastic flange 1704 in an "S" allows the peel strength of the flange to be low on the side of the flange where the adhesive layer is applied. Furthermore, shaping the flange in an S-shape may allow the compressive force path to take a desired route through the stack to enable higher cell stack compression to be achieved, if wanted. The S-shaped plate may reduce the likelihood of the flange dinting into adjacent channels of the membrane frame plate and restricting electrolyte flow.

Additionally, the elastic flange 1704 may be heat welded to the bipolar frame plate 1706, indicated at 1906. In this way, a strengthened connection may be formed between the frame and conductive plate. Heat welding the frame to the flange may, in some examples, allow adhesive bonding between the components to be foregone. However, both adhesive bonding and heat welding may be used to couple the frame to the flange, in other examples. A mesh 1902 and a membrane 1904 positioned in the membrane frame plate 1900, are shown in FIG. 19.

Figure 20:
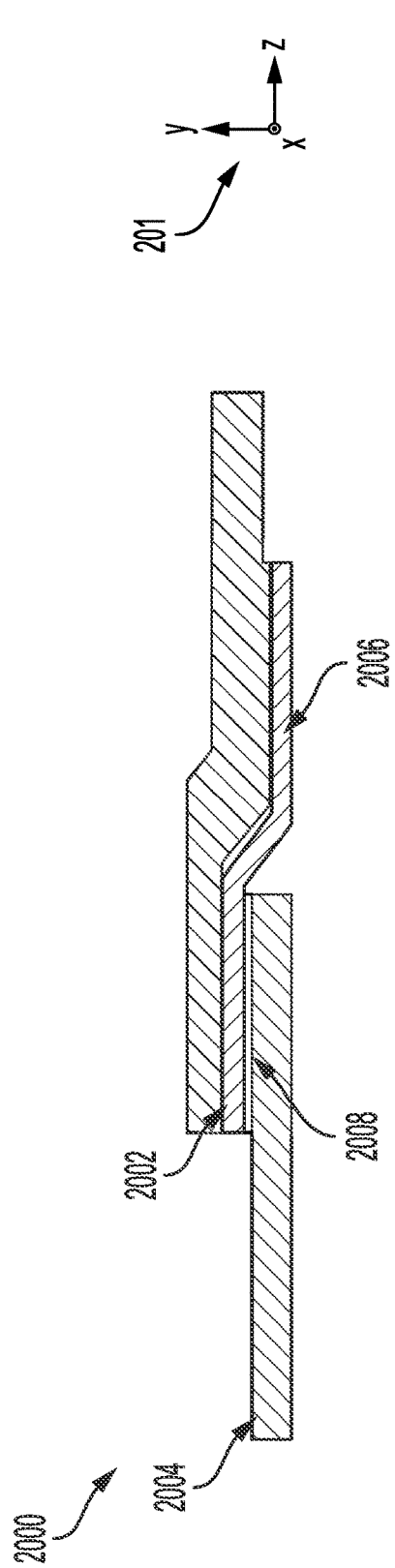
FIG. 20 shows another example of a bipolar plate assembly.

FIG. 20 shows a side view of another example of a bipolar plate assembly 2000. The bipolar plate assembly 2000 again includes a bipolar frame 2002, a bipolar plate 2004, and an elastic flange 2006 at the interface between the frame and the bipolar plate. A layer of adhesive 2008 is shown bonding the bipolar plate 2004 to the elastic flange 2006. The elastic flange 2006 is again profiled with an S-shape, providing the aforementioned benefits with regard to stack compression, peel strength, etc.

Figure 21:
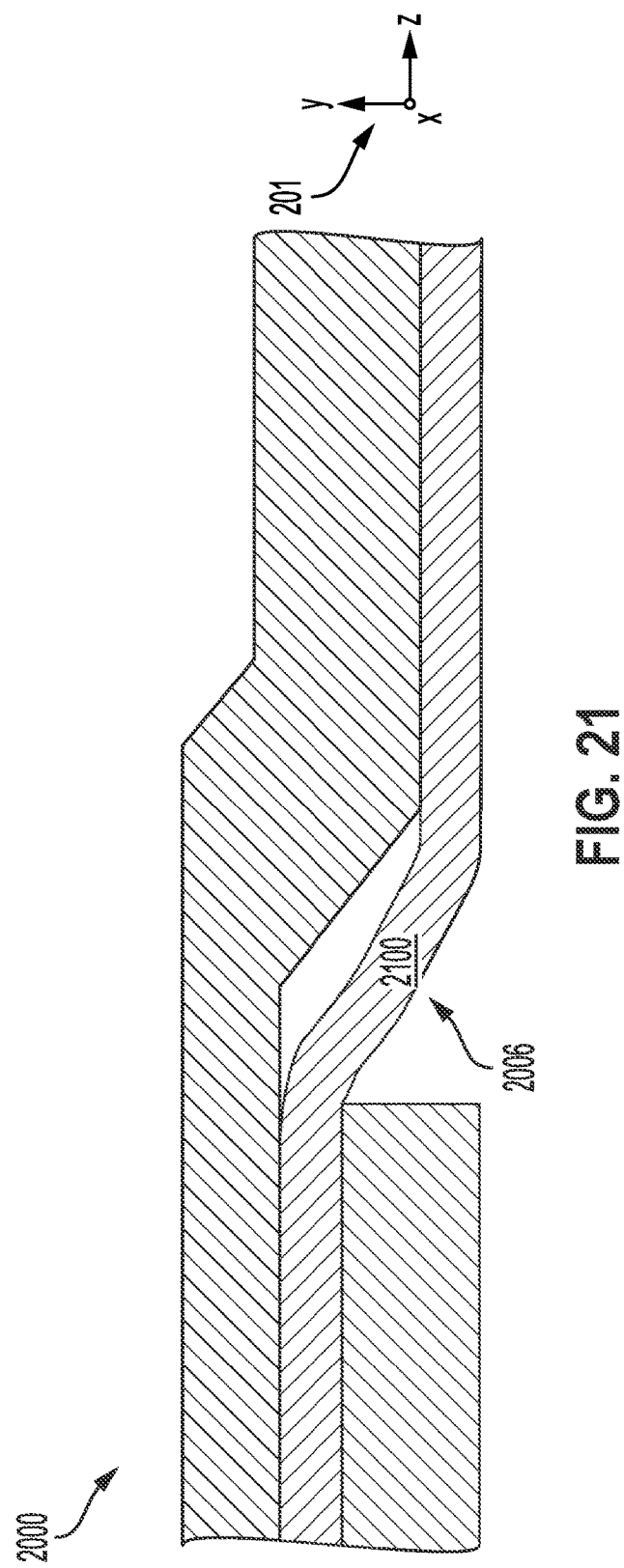
FIG. 21 shows a use-case example of thermal loading of bipolar plate assembly, depicted in FIG. 20.

FIG. 21 shows the bipolar plate assembly 2000 when thermal loading is applied to the assembly. As illustrated, the elastic flange 2006 and specifically section 2100 does not substantially deflect and undesirably affect flow in electrolyte channels in the cell stack.

Figure 22:
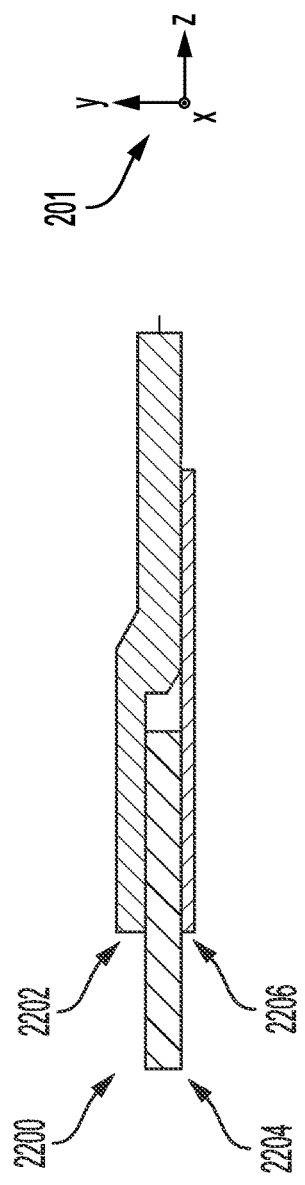

FIGS. 22-25 illustrate other examples of bipolar plate assemblies. Turning specifically to FIG. 22 showing a bipolar plate assembly 2200. The bipolar plate assembly 2200 includes a bipolar frame 2202 and a bipolar plate 2204 with an elastic flange 2206 extending between the frame and the plate. The elastic flange 2206 has a planar shape that may simplify installation. The molding geometry of the bipolar plate assembly 2200, depicted in FIG. 22, is easier to manufacture and may have less expensive parts than other bipolar plate assemblies described herein.

Figure 23:
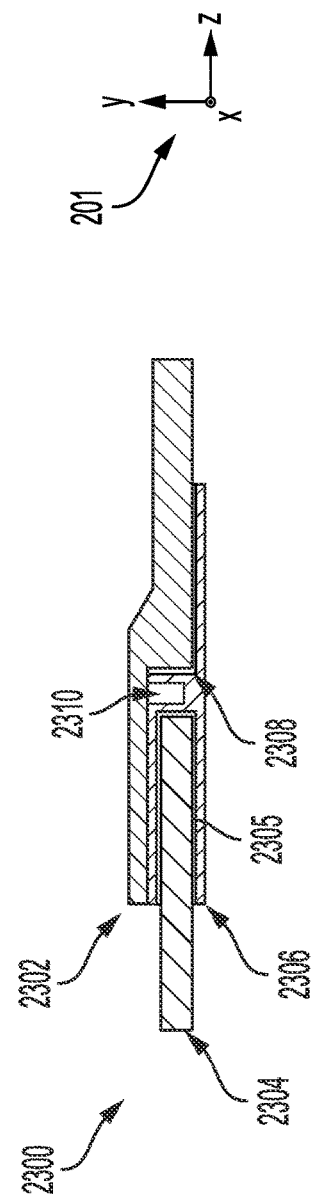

FIG. 23 shows a bipolar plate assembly 2300 that includes a bipolar frame 2302, a bipolar plate 2304, and an elastic flange 2306. The elastic flange 2306 partially encloses a portion of the bipolar plate 2304 and adhesive 2305 may be applied between the flange and the plate. The elastic flange 2306 extends along sides 2308 of the bipolar frame 2302 and forms a gap 2310 between the bipolar plate 2304 and the frame. The bipolar plate assembly 2300, illustrated in FIG. 23, may have a more complex molding geometry and may use more expensive parts but provides a larger sealing surface than other bipolar plate assemblies described herein.

Figure 24:
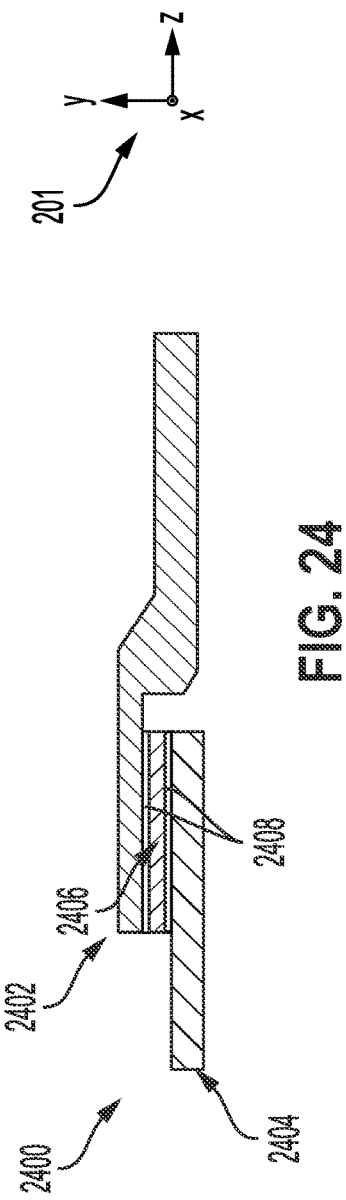

FIG. 24 depicts a bipolar plate assembly 2400 that includes a bipolar frame 2402, a bipolar plate 2404, and an elastic flange 2406. Adhesive (e.g., epoxy) 2408 is shown applied on both vertical sides of the elastic flange 2406. The bipolar plate assembly 2400, depicted in FIG. 24, has a less complex molding geometry and may use less expensive parts than other bipolar plate assemblies described herein.

FIG. 25 illustrates a bipolar plate assembly 2500 that includes a bipolar frame 2502, a bipolar plate 2504, and elastic flanges 2506. An air gap 2508 is formed between the bipolar plate 2504 and the bipolar frame 2502 in the example shown in FIG. 25. The bipolar plate assembly 2500, illustrated in FIG. 25, has a larger sealing surface (e.g., twice the sealing surface) while using similar parts and manufacturing molding tools for the other bipolar plate assemblies described herein.

FIGS. 26-27 depict examples of materials 2600 and 2700 that may be used to construct an elastic flange, such as the elastic flange 1422, shown in FIG. 14, or the elastic flanges depicted in FIGS. 20-25. The material is shown including textured surfaces to improve adhesion strength between the bipolar plate and the elastic flange. In one example, the texturing may be applied to the elastic flange in zones where adhesive is slated to be applied.

FIG. 26 depicts the elastic material 2600 with a textured surface 2602. The textured surface is shown having a square pattern. However, other patterns have been envisioned such as the diamond pattern on the textured surface 2702 of the elastic material 2700, illustrated in FIG. 27. Texturing the surface of the elastic flange increases adhesion strength between flange and the bipolar plate by increasing the amount of adhesive that can be applied between the flange and the plate. The textured surface may be created by pressing a metal file against the surface slated for texturing.

Specifically, in one use-case example, a metal plate (e.g., titanium mesh) may be pressed again a layer of an elastic material (e.g., TPV rubber). Further in such an example, layers of foam such as silicone foam may be positioned below the elastic material and heat may be applied during flange compression to create the textured surface. However, other suitable techniques for texturing the surface of the flange have been contemplated.

The technical effect of providing a redox flow battery with stackable detents and protrusions in pressure plates is to increase battery modularity and allow for efficient scaling of the battery system's power and/or storage capacity. The technical effect of providing an elastic flange in the redox flow battery is to accommodate for cell stack warping and reduce the chance of the warping restricting electrolyte flow in the battery.

FIGS. 2-27 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The invention will further be described in the following paragraphs. In one aspect, a redox flow battery is provided that comprises a cell stack assembly including: a plate assembly positioned on a lateral side of the cell stack assembly and comprising: an elastic flange including a recess mated with a section of a conductive plate and compliant in at least one of a lateral direction and a vertical direction; and a plate frame coupled to the elastic flange.

In another aspect, a redox flow battery is provided that comprises a cell stack assembly including: a plate assembly positioned on a lateral side of the cell stack assembly and comprising: an elastic flange including a recess mated with a section of a conductive plate and compliant in a vertical direction and/or a lateral direction; and a plate frame coupled to the elastic flange; where a longitudinally aligned gap is formed between a section of the plate frame and the elastic flange.

In any of the aspects or combinations of the aspects, the recess may surround at least a portion of two sides of the conductive plate.

In any of the aspects or combinations of the aspects, the elastic flange may be heat welded to the plate frame.

In any of the aspects or combinations of the aspects, the conductive plate may comprise graphite.

In any of the aspects or combinations of the aspects, the conductive plate may be a monopolar plate.

In any of the aspects or combinations of the aspects, the conductive plate may be a bipolar plate.

In any of the aspects or combinations of the aspects, the conductive plate may be adhesively coupled to the elastic flange.

In any of the aspects or combinations of the aspects, where the conductive plate may not be adhesively coupled to the elastic flange.

In any of the aspects or combinations of the aspects, the elastic flange may include a textured surface adhesively attached to a surface of the conductive plate.

In any of the aspects or combinations of the aspects, the elastic flange may comprise rubber.

In any of the aspects or combinations of the aspects, the plate assembly may be an endplate assembly and where the plate frame is an endplate frame coupled to a pressure plate.

In any of the aspects or combinations of the aspects, the elastic flange may mate with the conductive plate to form a double lap joint.

In any of the aspects or combinations of the aspects, the elastic flange may be longitudinally offset from a peripheral flange of the plate frame.

In any of the aspects or combinations of the aspects, the plate assembly may be an endplate assembly and where the plate frame may be an endplate frame coupled to a pressure plate.

In any of the aspects or combinations of the aspects, the mated interface between the recess and the conductive plate may form a double lap joint.

In any of the aspects or combinations of the aspects, the elastic flange may comprise rubber and the conductive plate comprises graphite.

In any of the aspects or combinations of the aspects, the elastic flange may include a textured surface having a textured pattern in face sharing contact with a surface of the conductive plate.

In any of the aspects or combinations of the aspects, the conductive plate may be a monopolar plate.

In any of the aspects or combinations of the aspects, the conductive plate may be a bipolar plate.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A redox flow battery comprising:
a cell stack assembly including:
a plate assembly positioned on a lateral side of the cell stack assembly and comprising:
an elastic flange including a recess mated with a section of a conductive plate and compliant in at least one of a lateral direction and a vertical direction; and
a plate frame coupled to the elastic flange,
where the plate assembly is an endplate assembly, and where the plate frame is an endplate frame coupled to a pressure plate.

2. The redox flow battery of claim 1, where the recess surrounds at least a portion of two sides of the conductive plate.

3. The redox flow battery of claim 1, where the elastic flange is heat welded to the plate frame.

4. The redox flow battery of claim 1, where the conductive plate comprises graphite.

5. The redox flow battery of claim 1, where the conductive plate is a monopolar plate.

6. The redox flow battery of claim 1, where the conductive plate is a bipolar plate.

7. The redox flow battery of claim 1, where the conductive plate is adhesively coupled to the elastic flange.

8. The redox flow battery of claim 1, where the conductive plate is not adhesively coupled to the elastic flange.

9. The redox flow battery of claim 1, where the elastic flange includes a textured surface adhesively attached to a surface of the conductive plate.

10. The redox flow battery of claim 1, where the elastic flange comprises rubber.

11. The redox flow battery of claim 1, where the elastic flange mates with the conductive plate to form a double lap joint.

12. A redox flow battery comprising:
a cell stack assembly including:
a plate assembly positioned on a lateral side of the cell stack assembly and comprising:
an elastic flange including a recess mated with a section of a conductive plate and compliant in a vertical direction and/or a lateral direction; and
a plate frame coupled to the elastic flange;
where a longitudinally aligned gap is formed between a section of the plate frame and the elastic flange, and
where the plate assembly is an endplate assembly, and where the plate frame is an endplate frame coupled to a pressure plate.

13. The redox flow battery of claim 12, where the elastic flange is longitudinally offset from a peripheral flange of the plate frame.

14. The redox flow battery of claim 12, where the mated interface between the recess and the conductive plate forms a double lap joint.

15. The redox flow battery of claim 12, where the elastic flange comprises rubber and the conductive plate comprises graphite.

16. The redox flow battery of claim 12, where the elastic flange includes a textured surface having a textured pattern in face sharing contact with a surface of the conductive plate.

17. The redox flow battery of claim 12, where the conductive plate is a monopolar plate.

18. The redox flow battery of claim 12, where the conductive plate is a bipolar plate.

* * * * *